(12) United States Patent
Tashiro

(10) Patent No.: US 8,514,497 B2
(45) Date of Patent: Aug. 20, 2013

(54) ZOOM LENS AND IMAGE PICKUP APPARATUS HAVING THE SAME

(75) Inventor: Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/408,880

(22) Filed: Feb. 29, 2012

(65) Prior Publication Data

US 2012/0229915 A1    Sep. 13, 2012

(30) Foreign Application Priority Data

Mar. 7, 2011    (JP) ................. 2011-048670

(51) Int. Cl.
*G02B 15/14*    (2006.01)

(52) U.S. Cl.
USPC ........... 359/689; 359/680; 359/682; 359/683; 359/684; 359/691; 359/716; 359/717; 359/740; 359/753

(58) Field of Classification Search
USPC ................ 359/680, 682–684, 689, 691, 716, 359/717, 740, 753
See application file for complete search history.

(56) References Cited

U.S. PATENT DOCUMENTS

| | | | |
|---|---|---|---|
| 7,453,648 B2 | 11/2008 | Kurioka et al. | |
| 7,830,616 B2 * | 11/2010 | Masugi | 359/689 |
| 7,880,976 B2 * | 2/2011 | Tashiro | 359/691 |
| 2004/0156121 A1 * | 8/2004 | Ori et al. | 359/689 |
| 2010/0245629 A1 | 9/2010 | Nanba et al. | |
| 2010/0246026 A1 * | 9/2010 | Nanba | 359/682 |
| 2010/0328500 A1 * | 12/2010 | Yoshitsugu et al. | 359/689 |
| 2011/0007405 A1 * | 1/2011 | Sakai | 359/689 |
| 2011/0026131 A1 * | 2/2011 | Ito | 359/682 |

* cited by examiner

*Primary Examiner* — Evelyn A. Lester

(74) *Attorney, Agent, or Firm* — Canon U.S.A., Inc. IP Division

(57) ABSTRACT

A zoom lens includes, in order from an object side to an image side, a first lens unit having a negative refractive power and a second lens unit having a positive refractive power. A distance between the first lens unit and the second lens unit varies during zooming. The first lens unit includes, in order from the object side to the image side, a negative lens and a positive lens of which an object-side lens surface has a convex shape. An Abbe number of a material of the positive lens of the first lens unit, a focal length of the first lens unit, a distance between an image-side lens surface of the first lens unit and an object-side lens surface of the second lens unit at a telephoto end, and focal lengths of the entire zoom lens at a wide-angle end and the telephoto end are appropriately set.

15 Claims, 25 Drawing Sheets

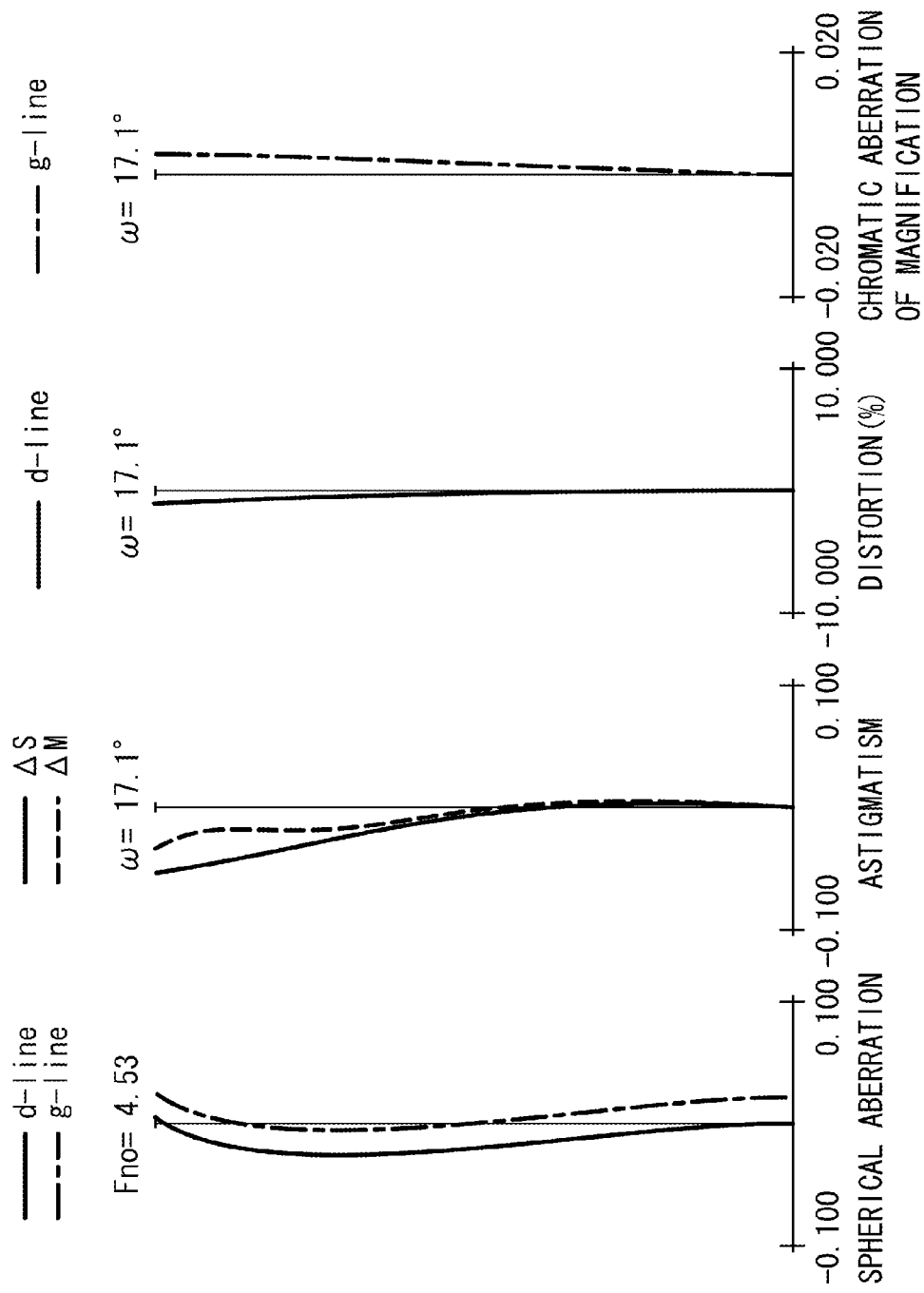

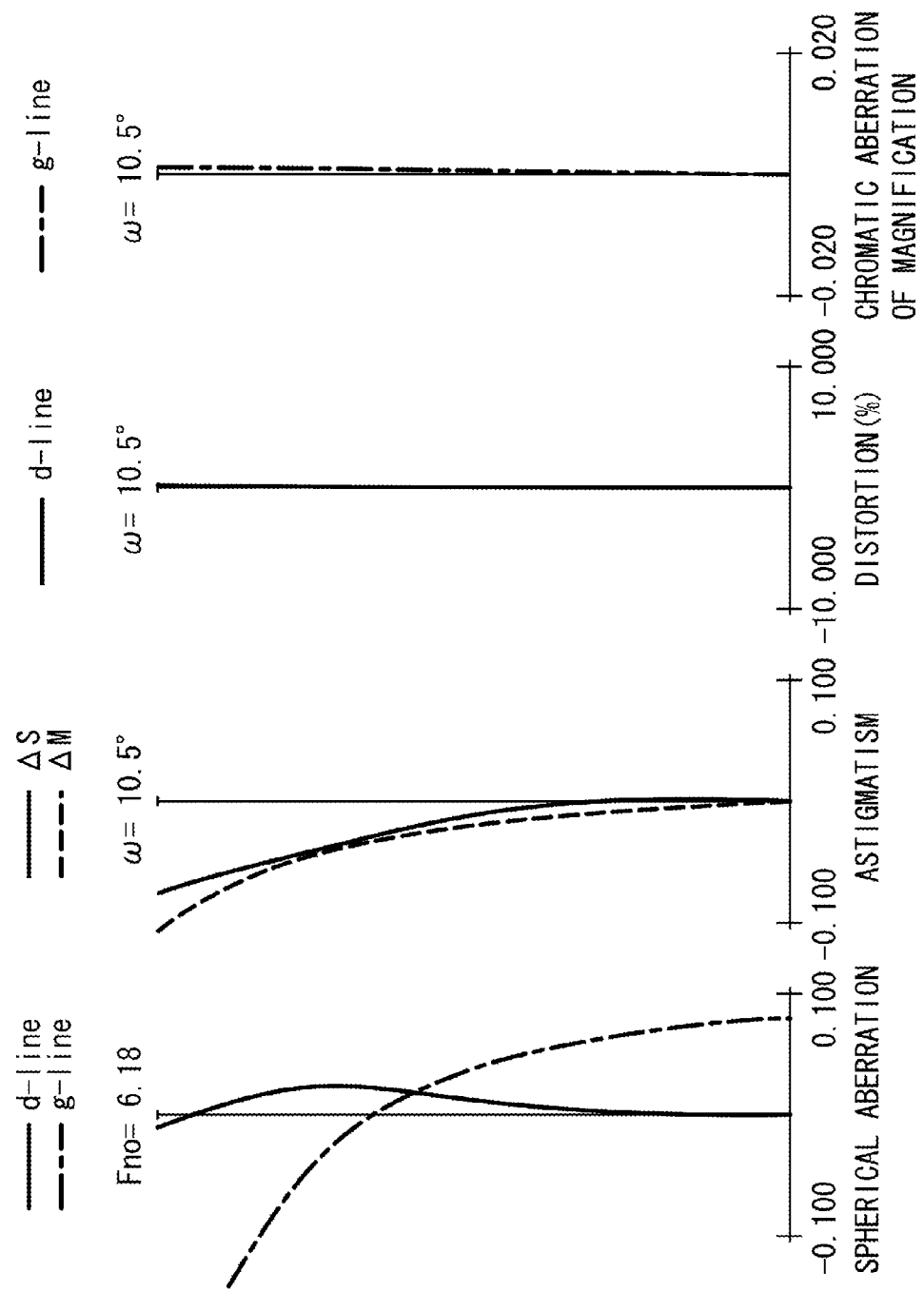

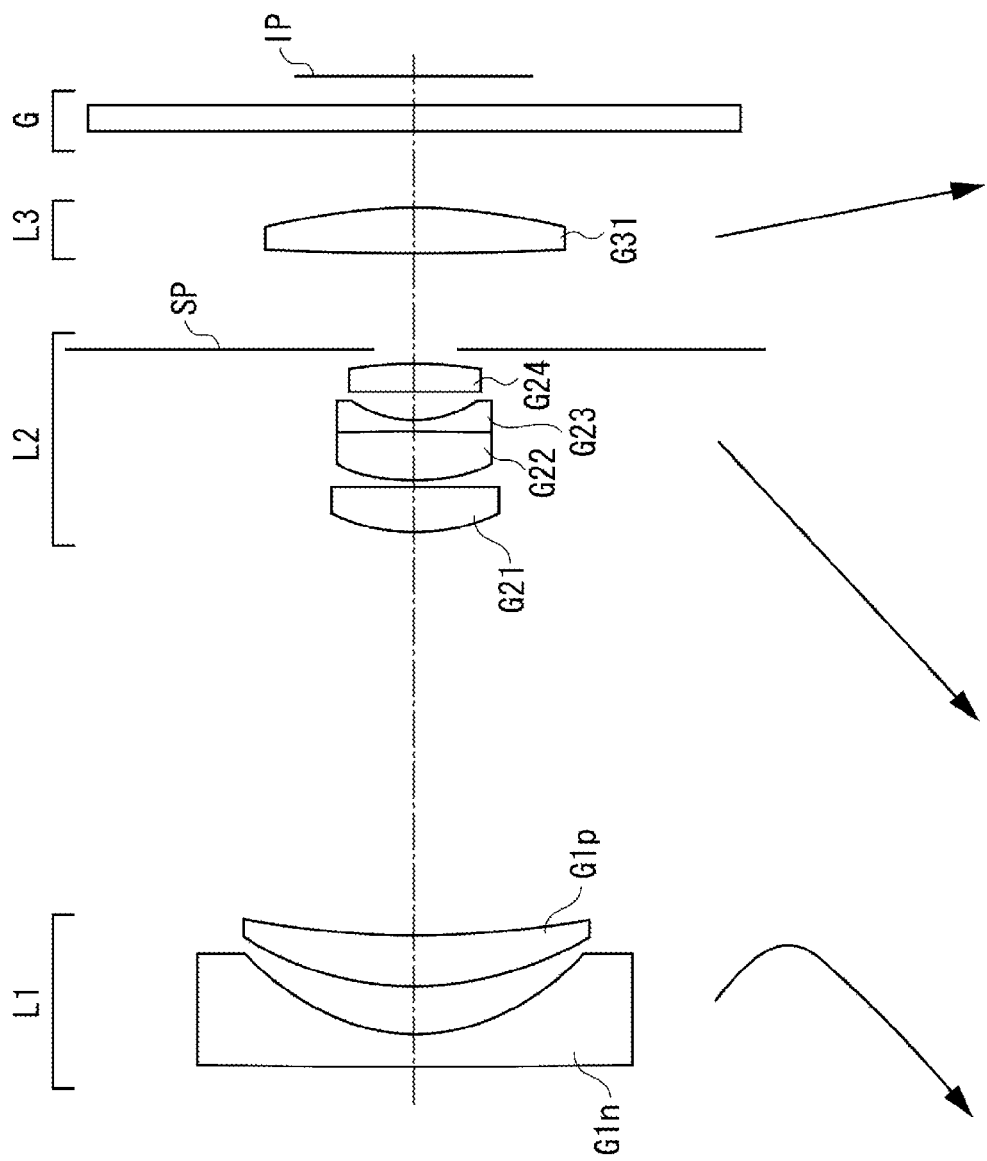

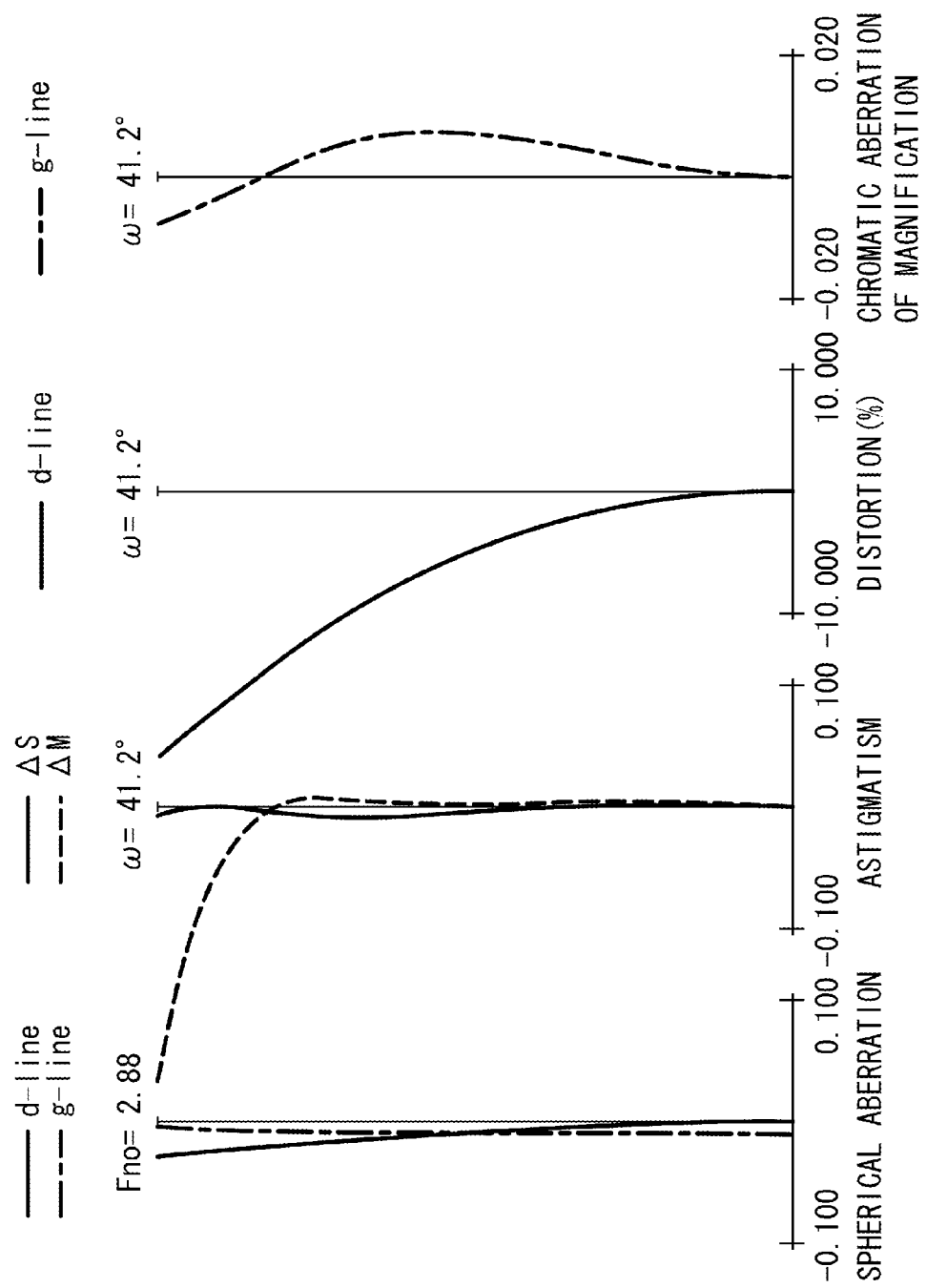

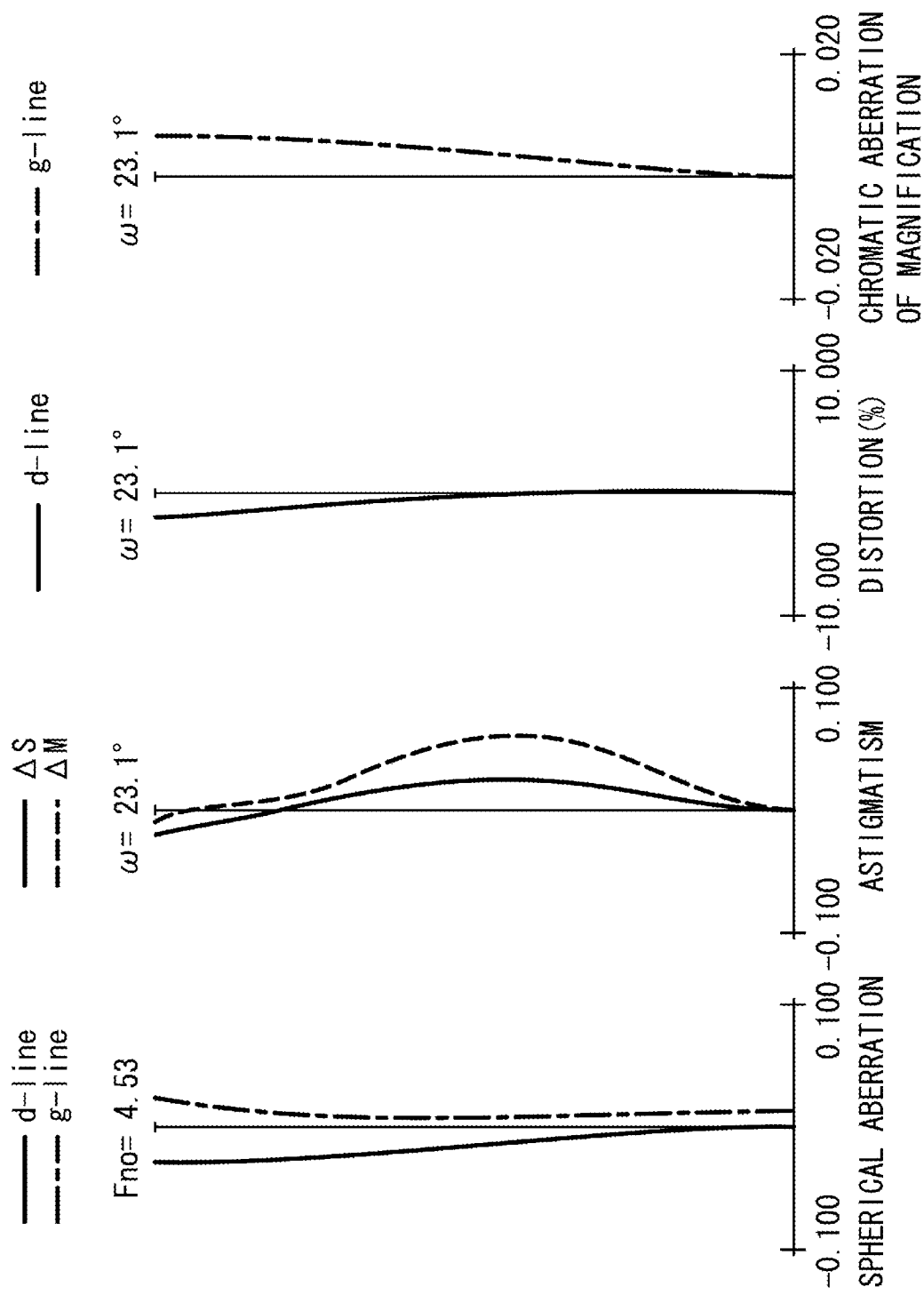

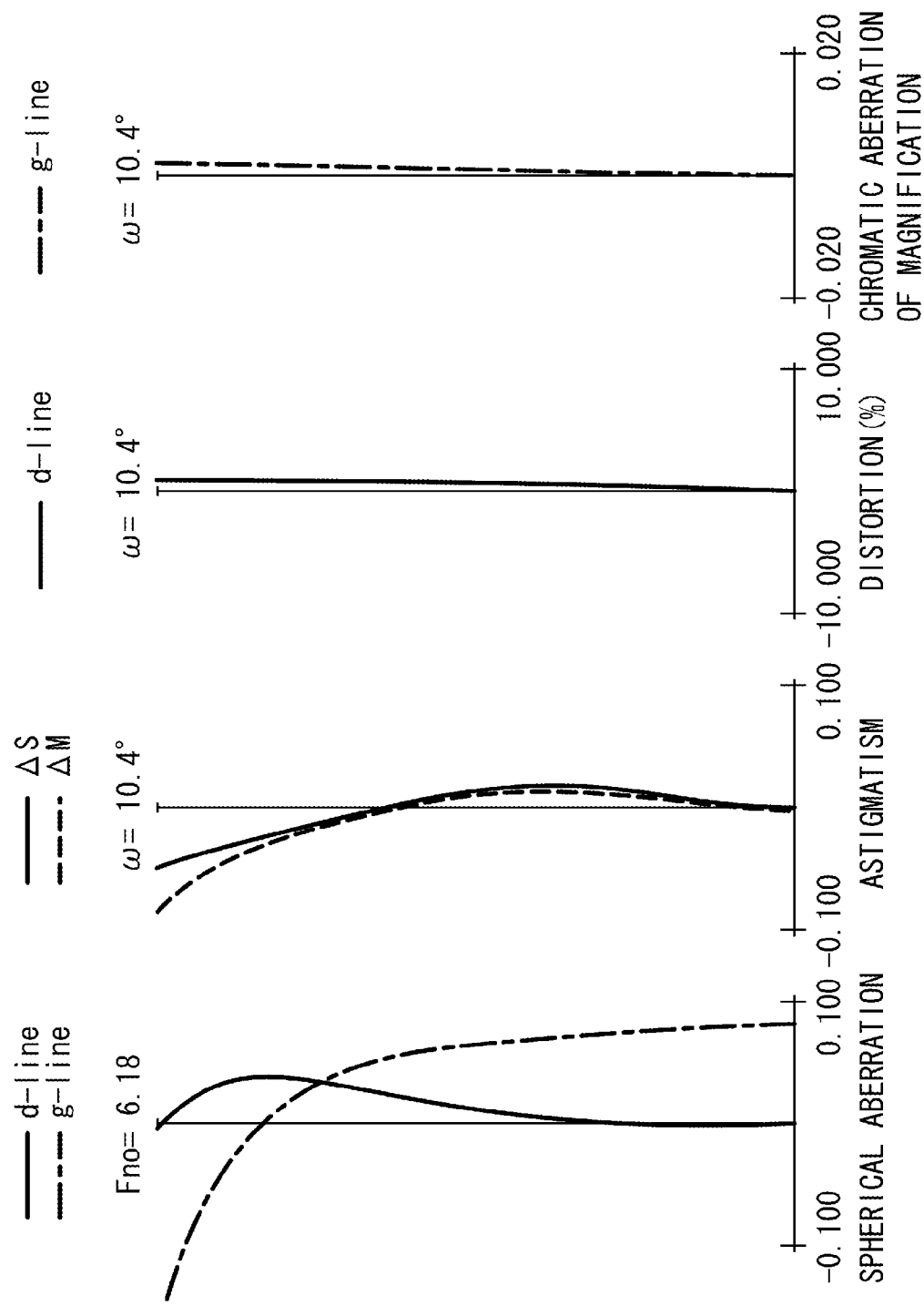

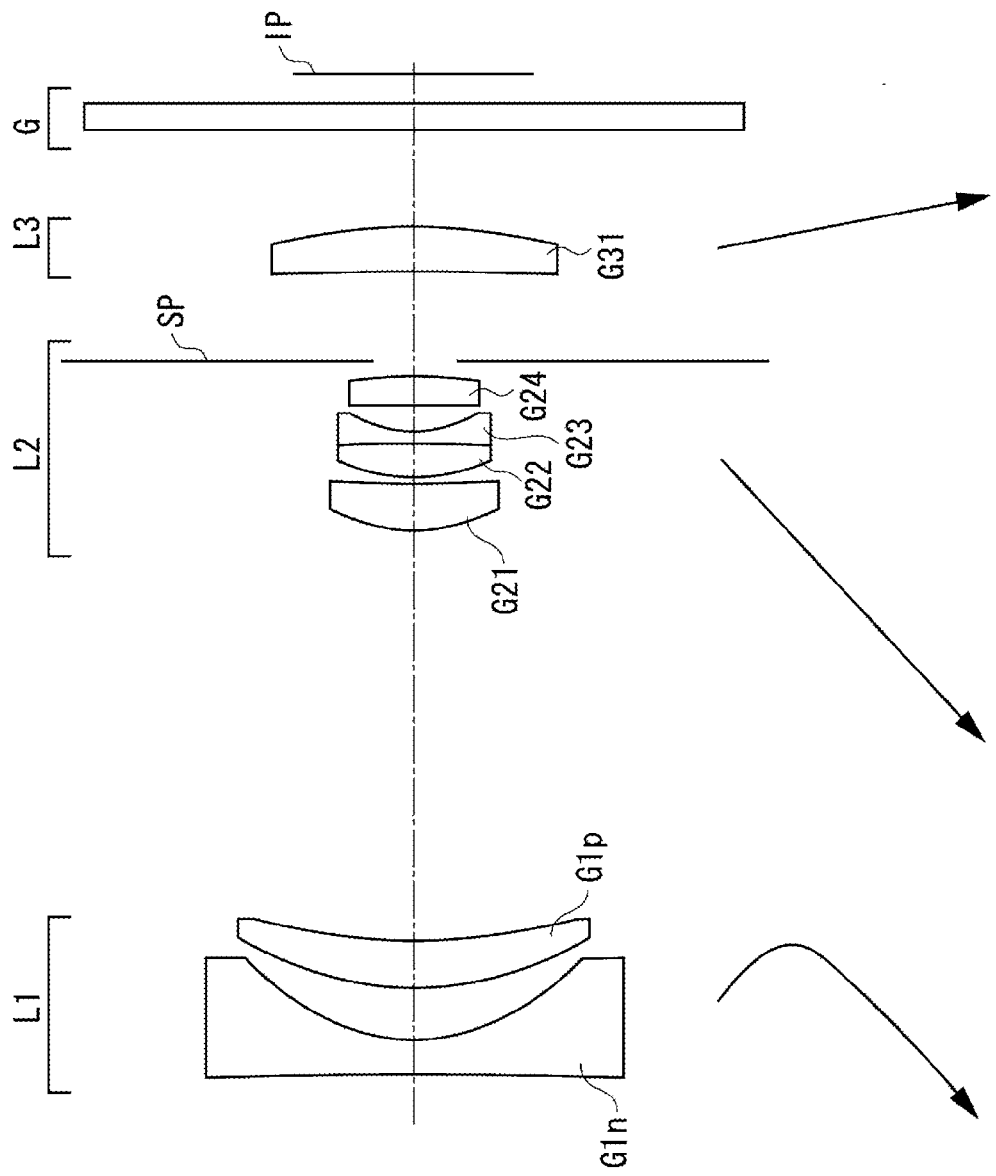

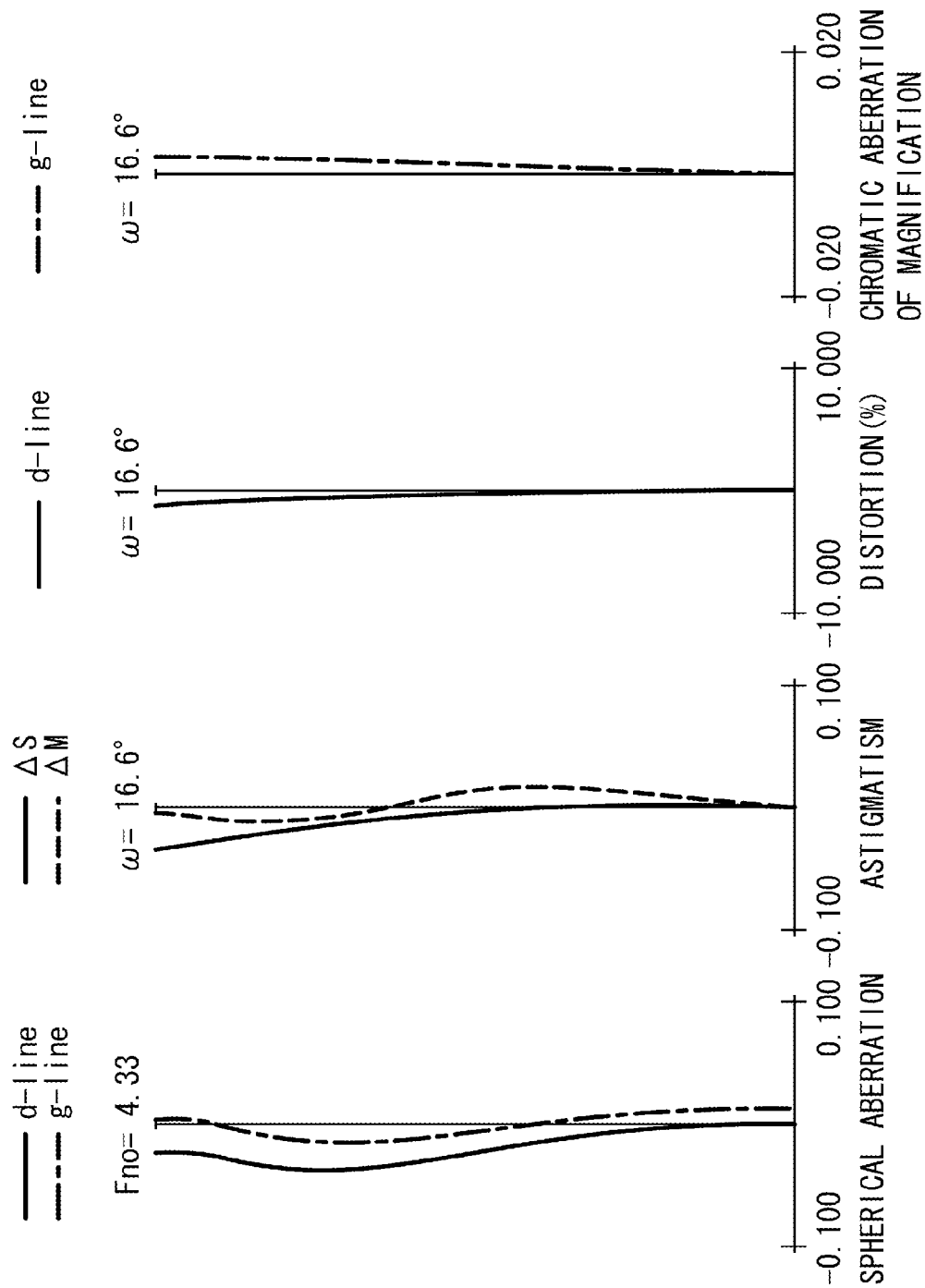

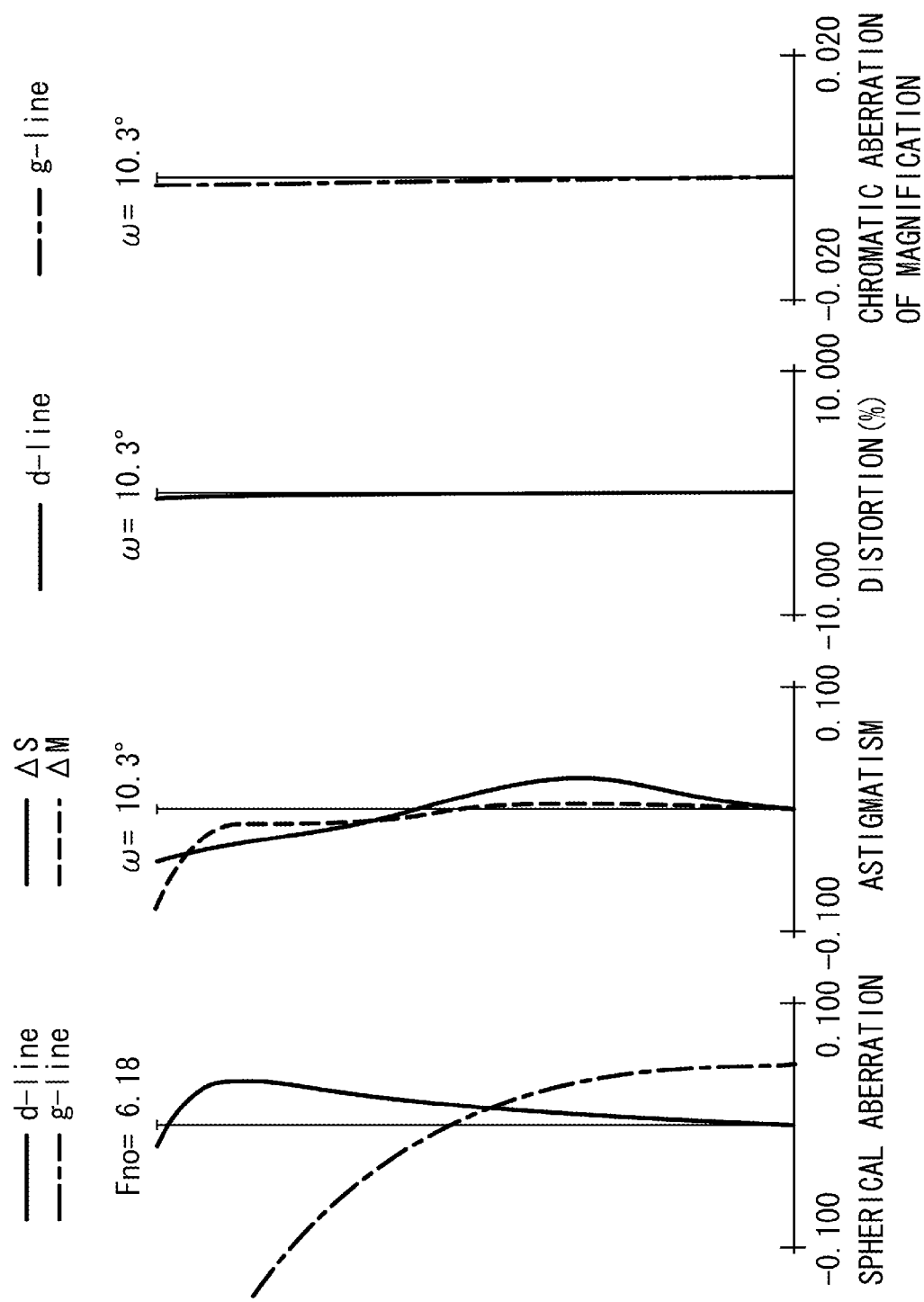

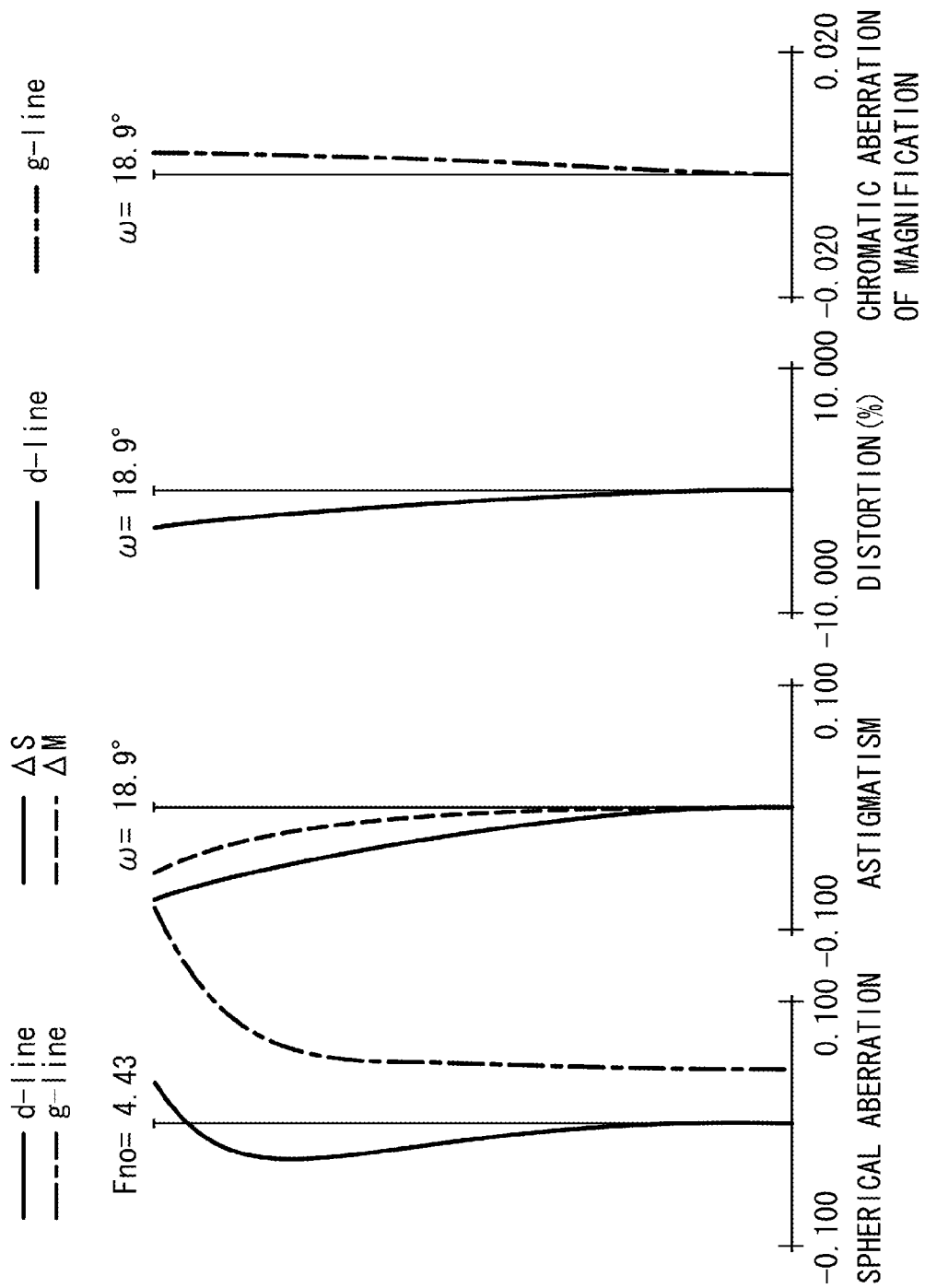

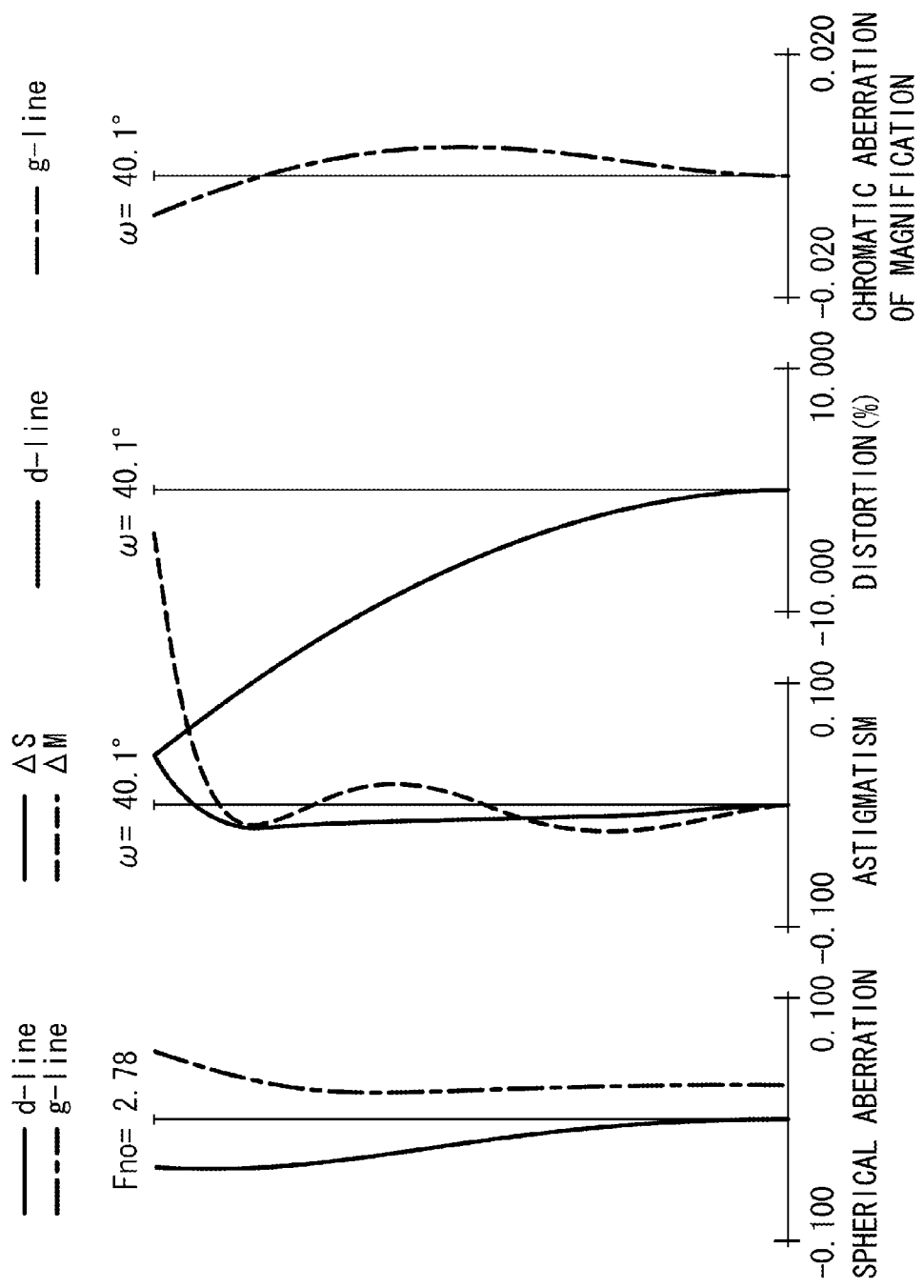

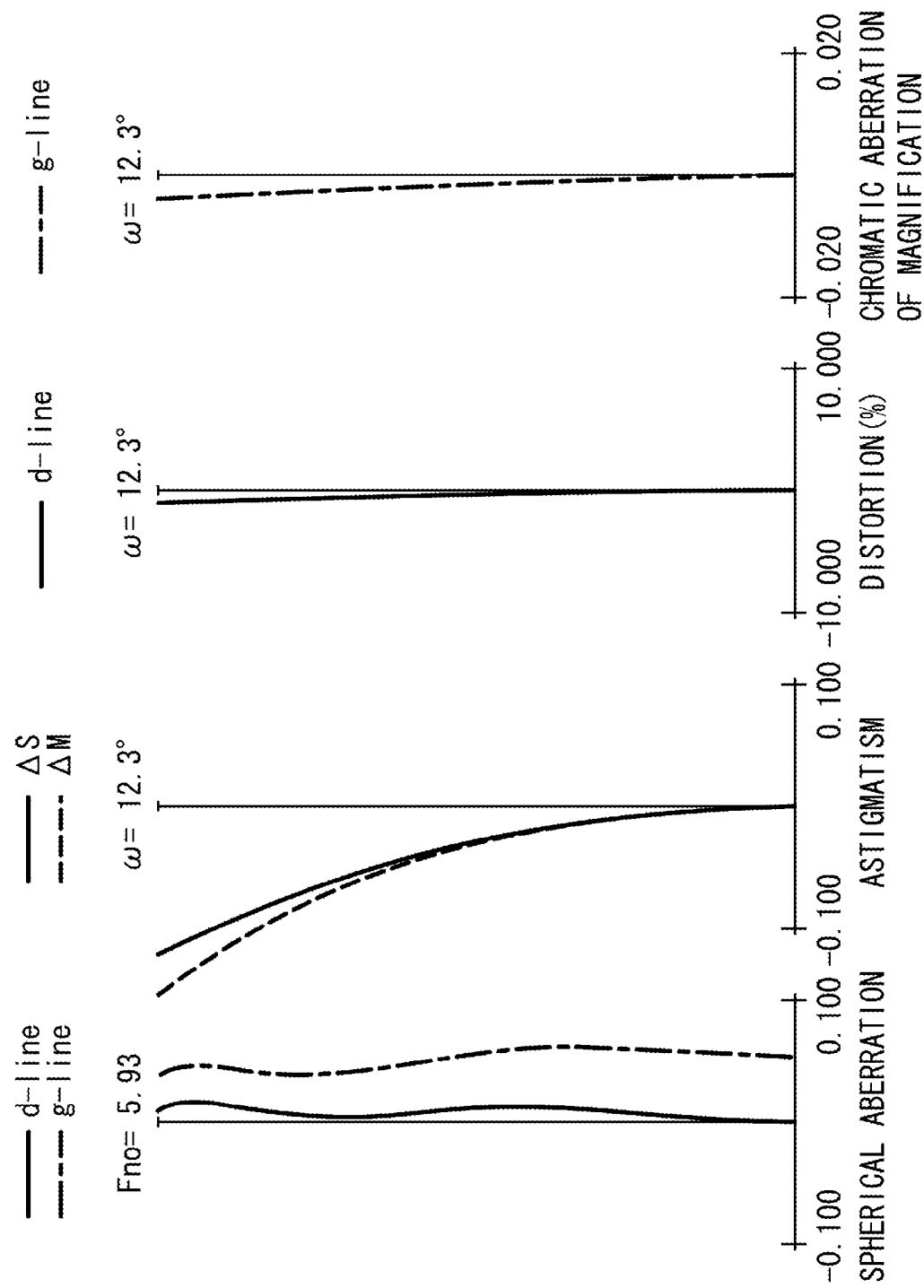

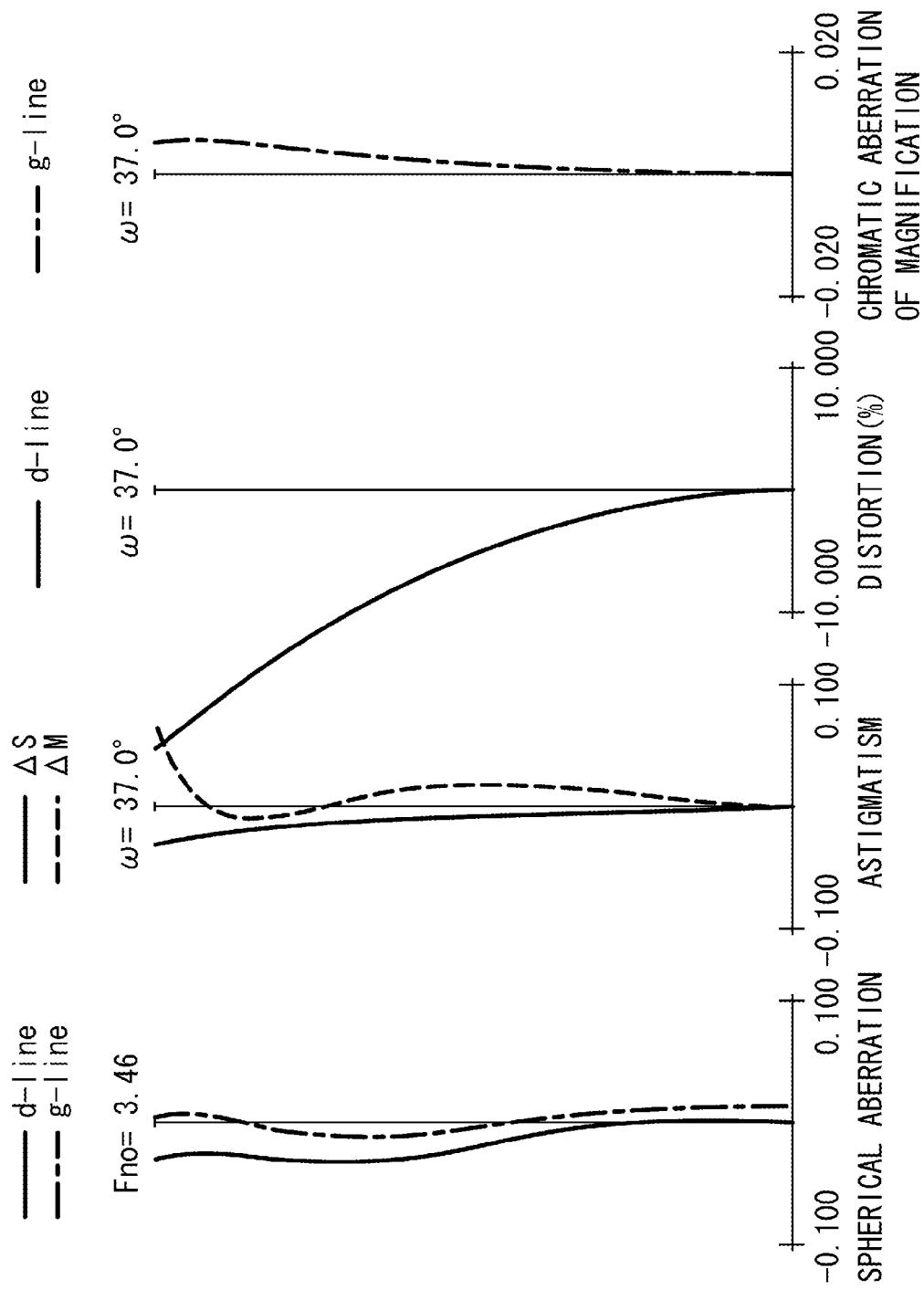

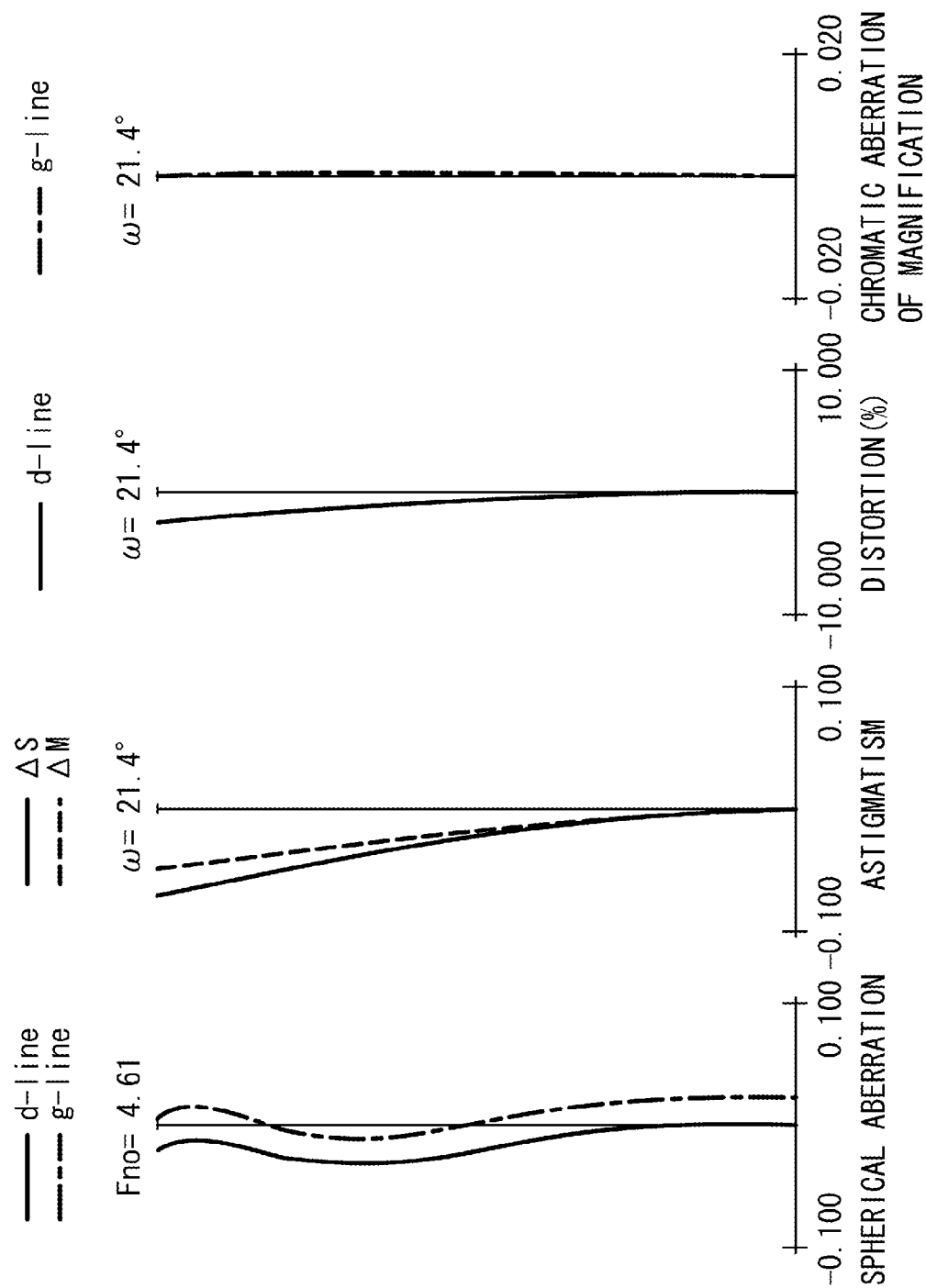

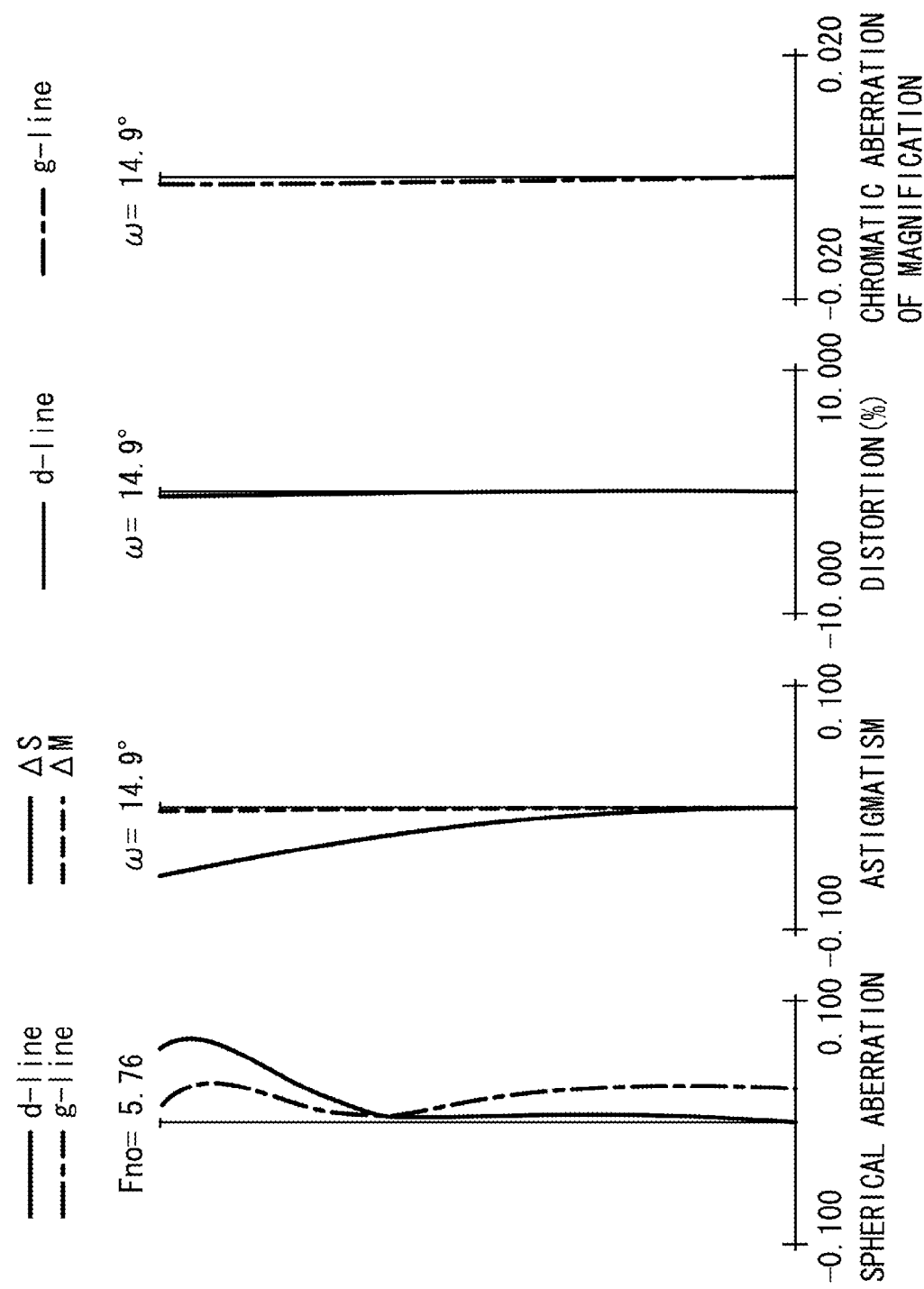

ZOOM LENS AND IMAGE PICKUP APPARATUS HAVING THE SAME

BACKGROUND OF THE INVENTION

1. Field of the Invention

The present invention is directed to a zoom lens and an image pickup apparatus having the zoom lens, and more particularly, to a zoom lens which is suitable for a digital camera, a video camera, a silver-halide film camera, and the like.

2. Description of the Related Art

Recently, a zoom lens having a wide angle of view, a high zoom ratio, and a small size has been in demand for a photographic optical system used for an image pickup apparatus such as a video camera or a digital still camera using a solid-state image sensor. As a method of miniaturizing an image pickup apparatus, there is known a retractable lens barrel, which allows an axial length of a zoom lens in an optical axis direction to be small during a non-photographing state by changing a distance between respective lens units of the zoom lens in a photographing state to become smaller. As a zoom lens that allows an easy reduction in size of the entire zoom lens and easy widening of an angle of view, there is known a negative lead type zoom lens, in which a lens unit having a negative refractive power is closest to an object side.

For example, there is known a three-unit zoom lens which includes, in order from an object side to an image side, a first lens unit having a negative refractive power, a second lens unit having a positive refractive power, and a third lens unit having a positive refractive power to perform zooming by moving the lens units.

U.S. Pat. No. 7,453,648 discusses a three-unit zoom lens having a zoom ratio of about three and a half angle of view of about 35 degrees at an wide-angle end, in which a material having a high refractive index and high-dispersion is used for a positive lens in a first lens unit.

Besides, as a negative lead type zoom lens, there is known a two-unit zoom lens which includes, in order from an object side to an image side, a first lens unit having a negative refractive power and a second lens unit having a positive refractive power to perform zooming by moving the lens units.

U.S. Patent Application Publication No. 2010/0245629 discusses a two-unit zoom lens having a zoom ratio of about three and a half angle of view of about 32 degrees at an wide-angle end, in which a material having a high refractive index and high-dispersion is used for a positive lens in a first lens unit.

As a method of miniaturizing a zoom lens, it is very effective to use a retractable lens barrel. However, when an amount of movement of each lens unit during zooming and focusing is large, the total lens length increases. As a result, although the retractable lens barrel is used, since a retraction length which is a length when the lens is retracted is large, it is difficult to miniaturize an image pickup apparatus.

In a negative lead type zoom lens, in shortening the retraction length, it is important to make the thickness of each lens unit as small as possible and preventing an effective diameter of the front lens from increasing. In addition, to correct chromatic aberration of magnification and curvature of field over entire zoom range and to miniaturize an entire zoom lens, it is important to appropriately set a refractive power arrangement of the first lens unit and a lens configuration of each lens unit.

In the zoom lens discussed in U.S. Pat. No. 7,453,648, the first lens unit includes one negative lens and one positive lens. In addition, the positive lens in the first lens unit is configured by using a material having a high refractive index, so that the thickness of the first lens unit decreases. However, since a physical stop is disposed at an object side of the second lens unit, the thickness in the optical axis direction during retraction tends to be increased.

In addition, at a telephoto end, it is difficult to reduce a distance between an image-side principal position of the first lens unit and an object-side principal position of the second lens unit to the utmost limits thereof. For this reason, it is difficult to decrease the thickness of each lens unit by weakening the refractive power of the second lens unit. In addition, since the refractive power of the first lens unit is small, when an aperture stop is considered to be disposed at an object side of the second lens unit, the effective diameter of the front lens is increased.

On the other hand, in the zoom lens discussed in U.S. Patent Application Publication No. 2010/0245629, the first lens unit includes one negative lens, an air distance, and one positive lens. In addition, a small thickness of the first lens unit is implemented by configuring the positive lens in the first lens unit by using a material having a high refractive index. In addition, a small thickness in the optical axis direction during retraction is implemented by configuring the second lens unit with no physical stop. However, since the distance between the first lens unit and the second lens unit at a telephoto end is large, the size of the entire zoom lens tends to be increased.

In general, in a negative lead type two-unit or three-unit zoom lens, to decrease the thickness of the entire zoom lens during retraction and obtain a high optical performance, it is important to make an appropriate lens configuration of a first lens unit having a negative refractive power. When the lens configuration of the first lens unit is not appropriate, it is difficult to miniaturize the entire zoom lens and obtain a high optical performance over the entire zoom range with a high zoom ratio.

SUMMARY OF THE INVENTION

The present invention is directed to a small-sized zoom lens allowing various aberrations to be well corrected and having an excellent optical performance, and to an image pickup apparatus having the same.

According to an aspect of the present invention, a zoom lens includes, in order from an object side to an image side, a first lens unit having a negative refractive power and a second lens unit having a positive refractive power, a distance between the first lens unit and the second lens unit varying during zooming, wherein the first lens unit includes, in order from the object side to the image side, a negative lens and a positive lens of which an object-side lens surface has a convex shape, and wherein, when an Abbe number of a material of the positive lens of the first lens unit is denoted by vd1p, a focal length of the first lens unit is denoted by f1, a distance between an image-side lens surface of the first lens unit and an object-side lens surface of the second lens unit at a telephoto end is denoted by d12t, and focal lengths of the entire zoom lens at a wide-angle end and the telephoto end are denoted by fw and ft, respectively, the following conditions are satisfied:

$5.0 < vd1p < 16.9$ $0.1 < (d12t/ft)*100 < 5.0$ $1.9 < |f1|/fw < 2.4.$

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A, 2B, and 2C are aberration charts of the zoom lens at the wide-angle end, a middle zoom position, and a telephoto end according to the first exemplary embodiment.

FIG. 3 is a lens cross-sectional view illustrating a zoom lens at a wide-angle end according to a second exemplary embodiment of the present invention.

FIGS. 4A, 4B, and 4C are aberration charts of the zoom lens at the wide-angle end, a middle zoom position, and a telephoto end according to the second exemplary embodiment, respectively.

FIG. 5 is a lens cross-sectional view illustrating a zoom lens at a wide-angle end according to a third exemplary embodiment of the present invention.

FIGS. 6A, 6B, and 6C are aberration charts of the zoom lens at the wide-angle end, a middle zoom position, and a telephoto end according to the third exemplary embodiment, respectively.

FIGS. 8A, 8B, and 8C are aberration charts of the zoom lens at the wide-angle end, a middle zoom position, and a telephoto end according to the fourth exemplary embodiment, respectively.

FIGS. 10A, 10B, and 10C are aberration charts of the zoom lens at the wide-angle end, a middle zoom position, and a telephoto end according to the fifth exemplary embodiment, respectively.

FIGS. 12A, 12B, and 12C are aberration charts of the zoom lens at the wide-angle end, a middle zoom position, and a telephoto end according to the sixth exemplary embodiment, respectively.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having a negative refractive power and a second lens unit having a positive refractive power. In addition, a distance of each lens unit is changed during zooming. In some case, a third lens unit having a positive refractive power may also be included at an image side of the second lens unit. In this case, the third lens unit is moved during zooming.

Figure 1:
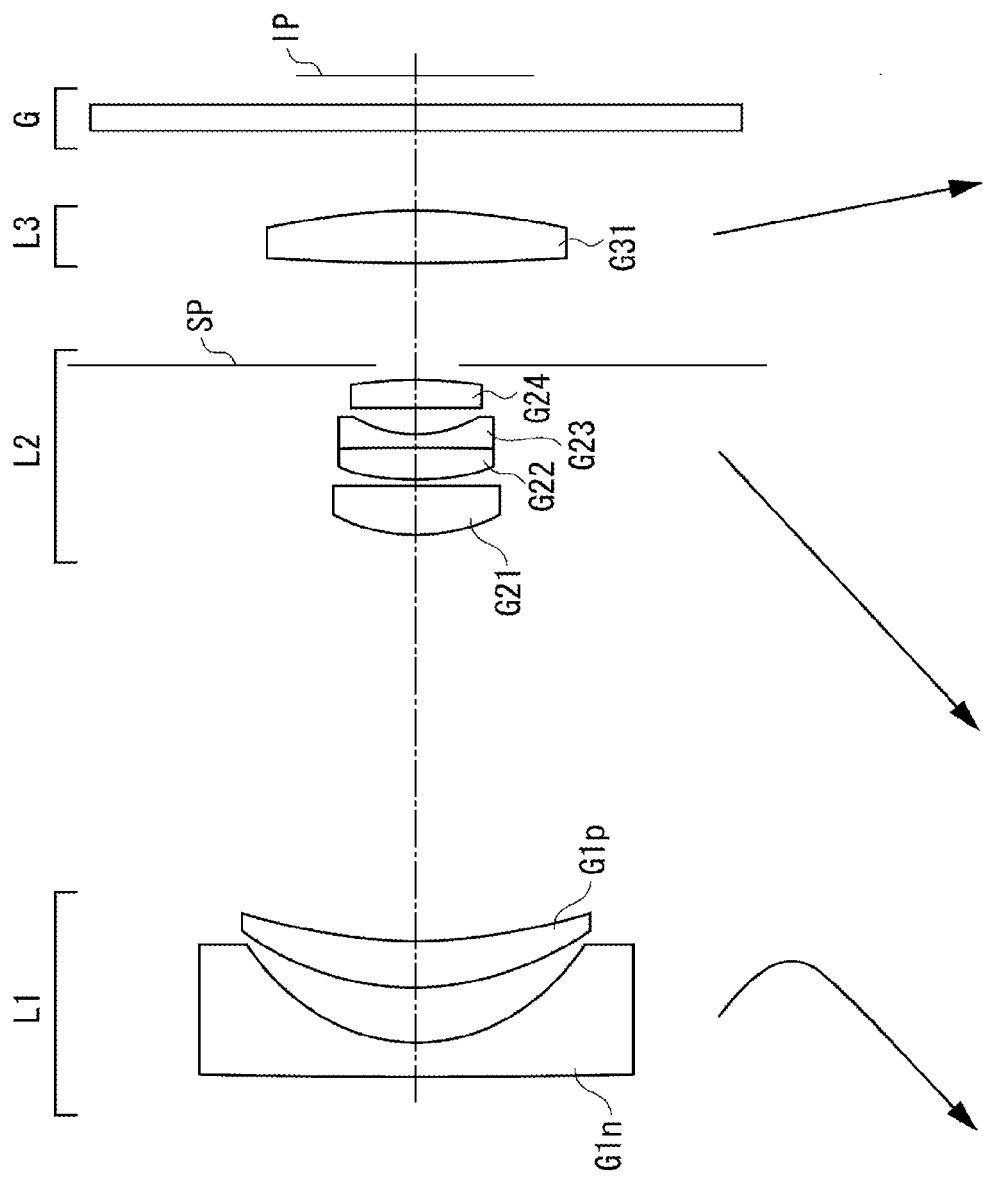
FIG. 1 is a lens cross-sectional view illustrating a zoom lens at a wide-angle end according to a first exemplary embodiment of the present invention.
Figure 2A:
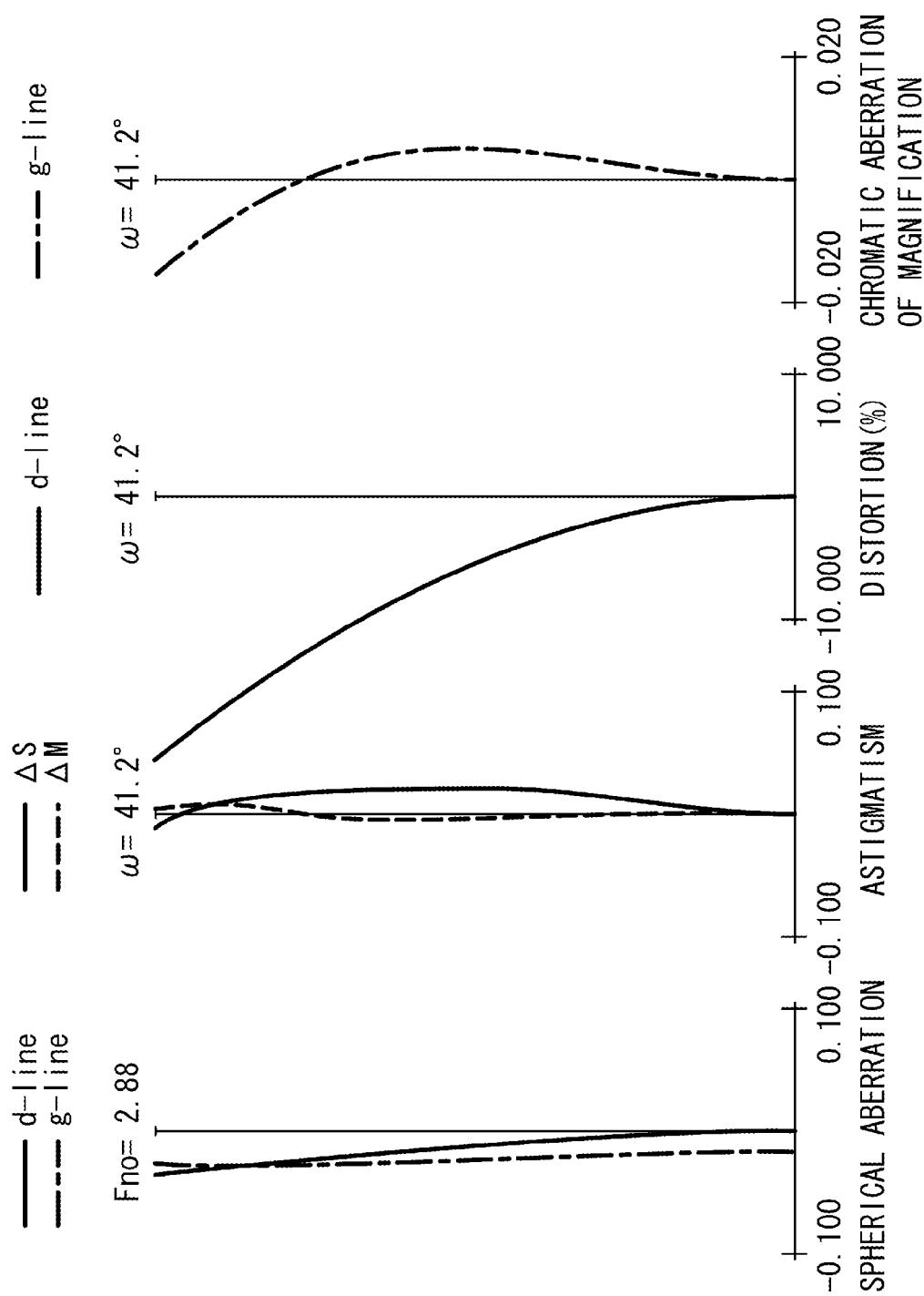

FIG. 1 is a cross-sectional view illustrating a zoom lens at a wide-angle end (short focal length end) according to a first exemplary embodiment of the present invention. FIGS. 2A, 2B, and 2C are aberration charts of the zoom lens at the wide-angle end, a middle zoom position, and a telephoto end (long focal length end) according to the first exemplary embodiment, respectively. FIG. 3 is a cross-sectional view illustrating a zoom lens at a wide-angle end according to a second exemplary embodiment of the present invention. FIGS. 4A, 4B, and 4C are aberration charts of the zoom lens at the wide-angle end, a middle zoom position, and a telephoto end according to the second exemplary embodiment, respectively.

Figure 6A:
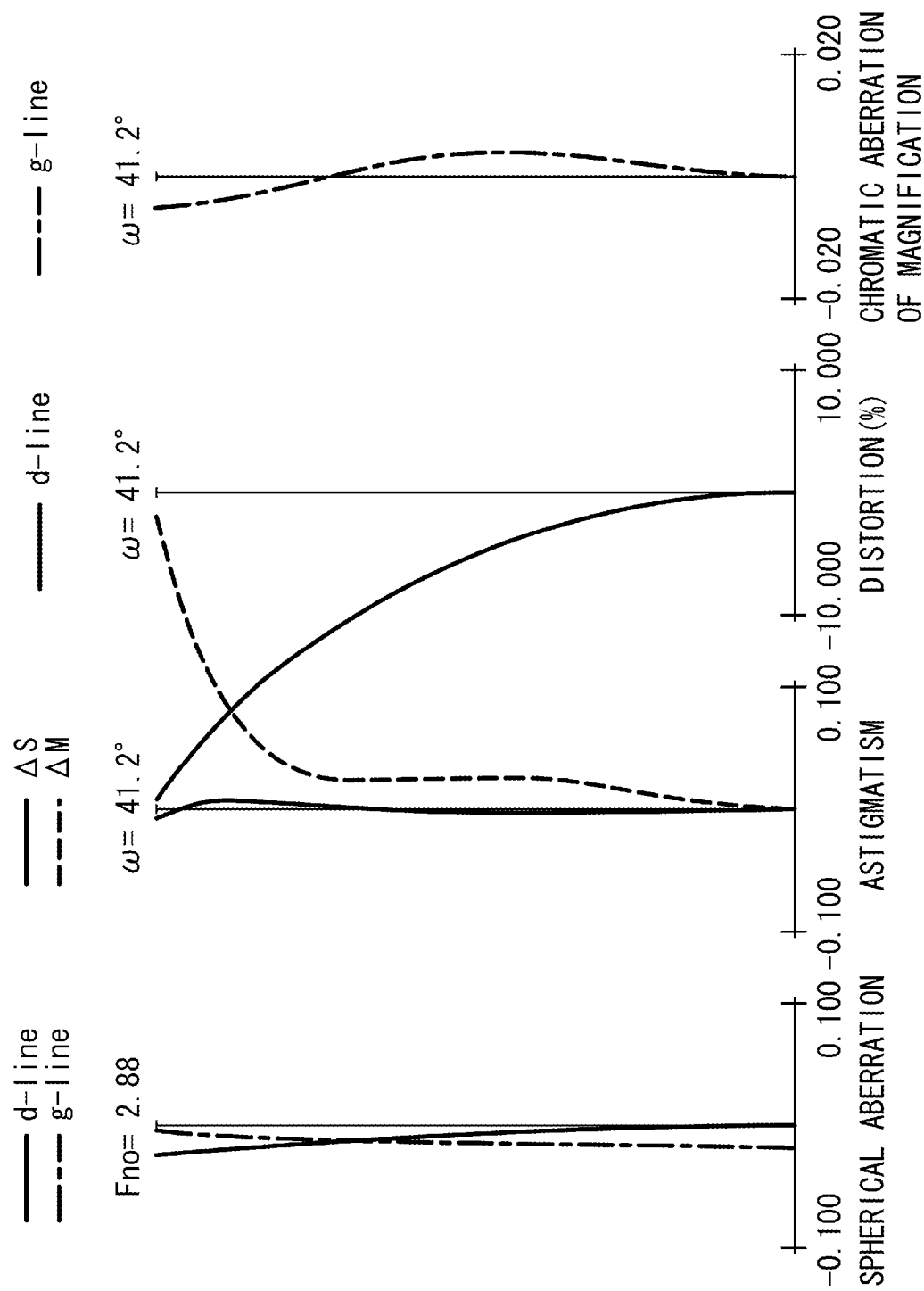
Figure 7:
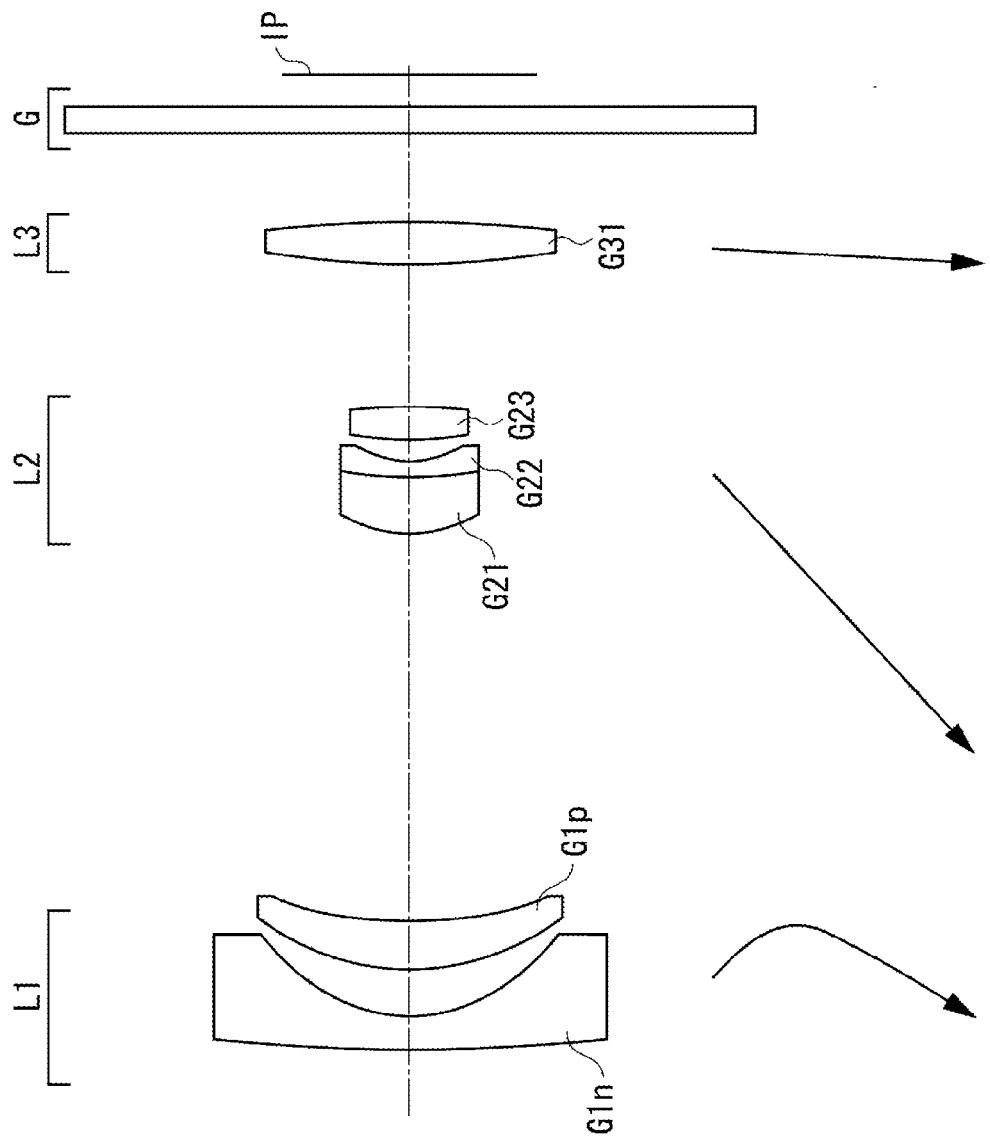
FIG. 7 is a lens cross-sectional view illustrating a zoom lens at a wide-angle end according to a fourth exemplary embodiment of the present invention.
Figure 8A:
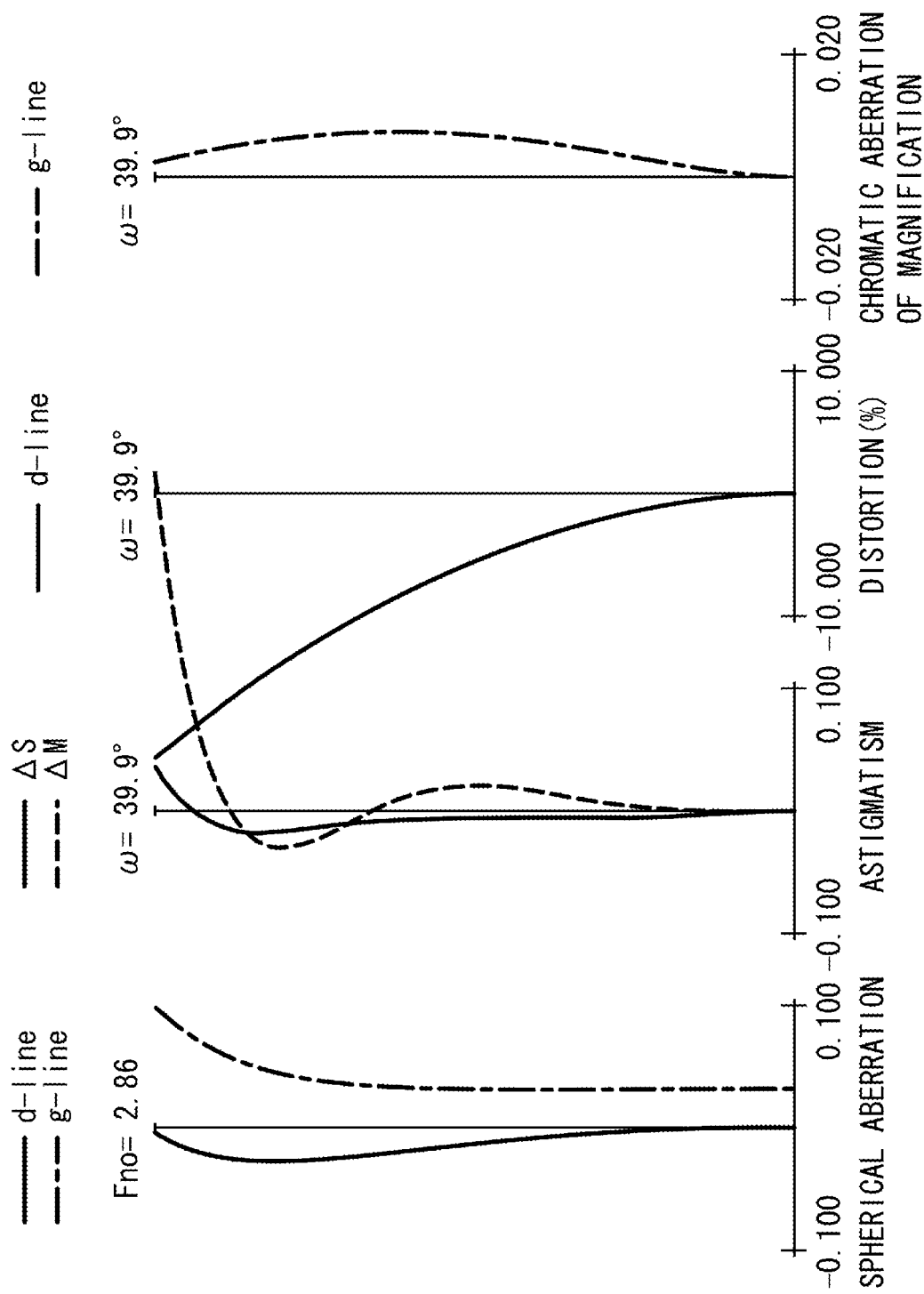
Figure 8C:
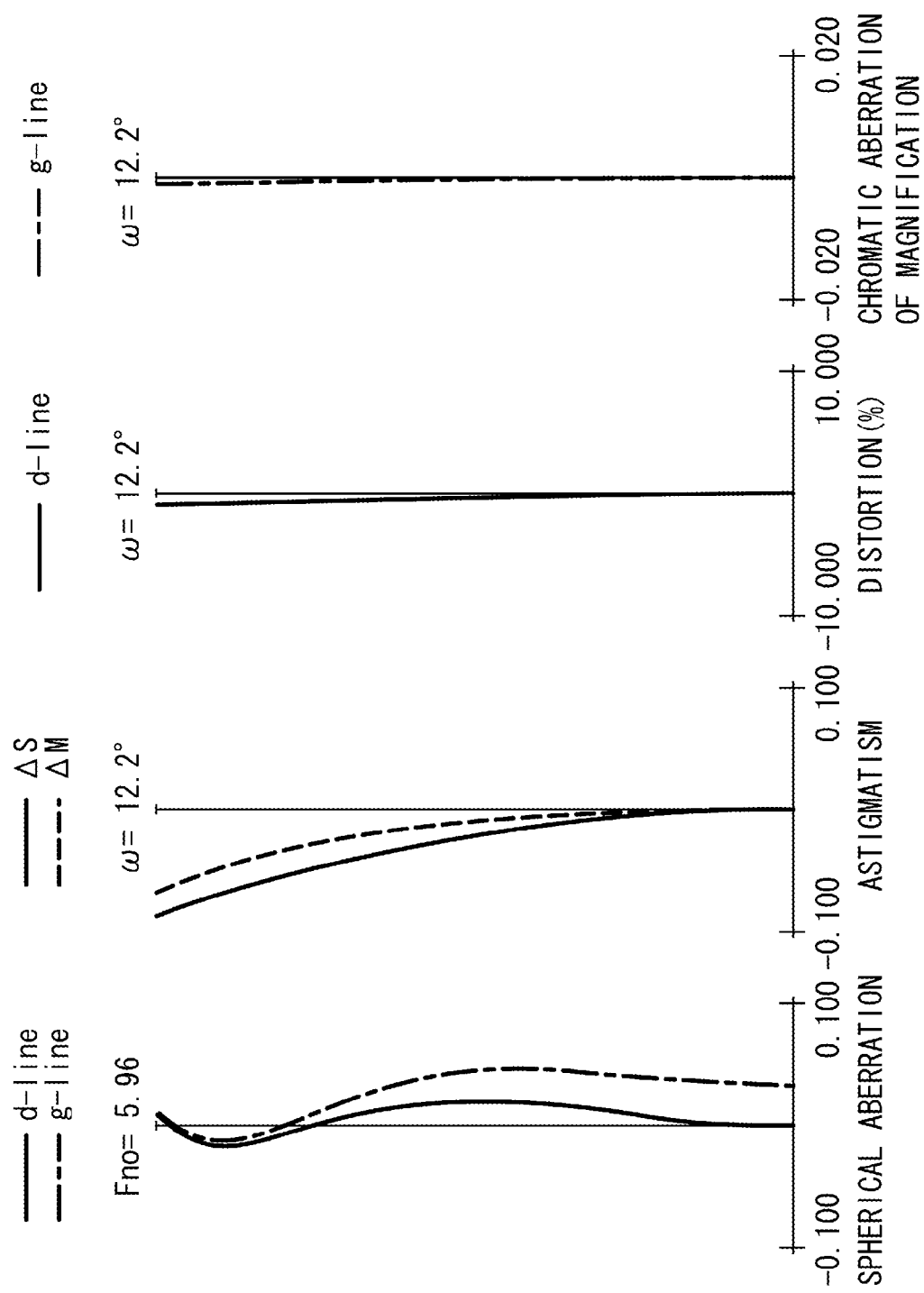

FIG. 5 is a cross-sectional view illustrating a zoom lens at a wide-angle end according to a third exemplary embodiment of the present invention. FIGS. 6A, 6B, and 6C are aberration charts of the zoom lens at the wide-angle end, a middle zoom position, and a telephoto end according to the third exemplary embodiment, respectively. FIG. 7 is a cross-sectional view illustrating a zoom lens at a wide-angle end according to a fourth exemplary embodiment of the present invention. FIGS. 8A, 8B, and 8C are aberration charts of the zoom lens at the wide-angle end, a middle zoom position, and a telephoto end according to the fourth exemplary embodiment, respectively.

Figure 9:
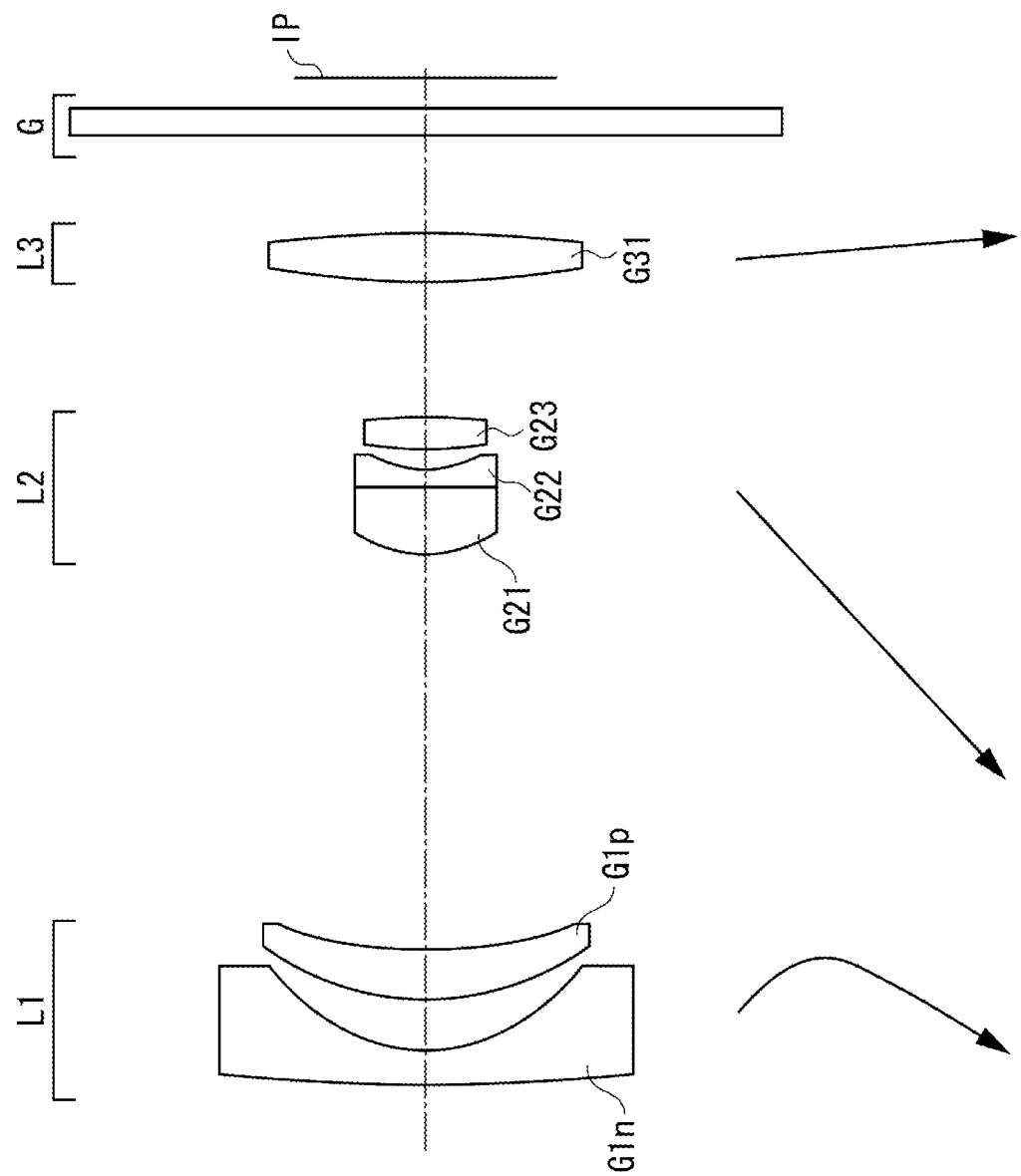
FIG. 9 is a lens cross-sectional view illustrating a zoom lens at a wide-angle end according to a fifth exemplary embodiment of the present invention.
Figure 10B:
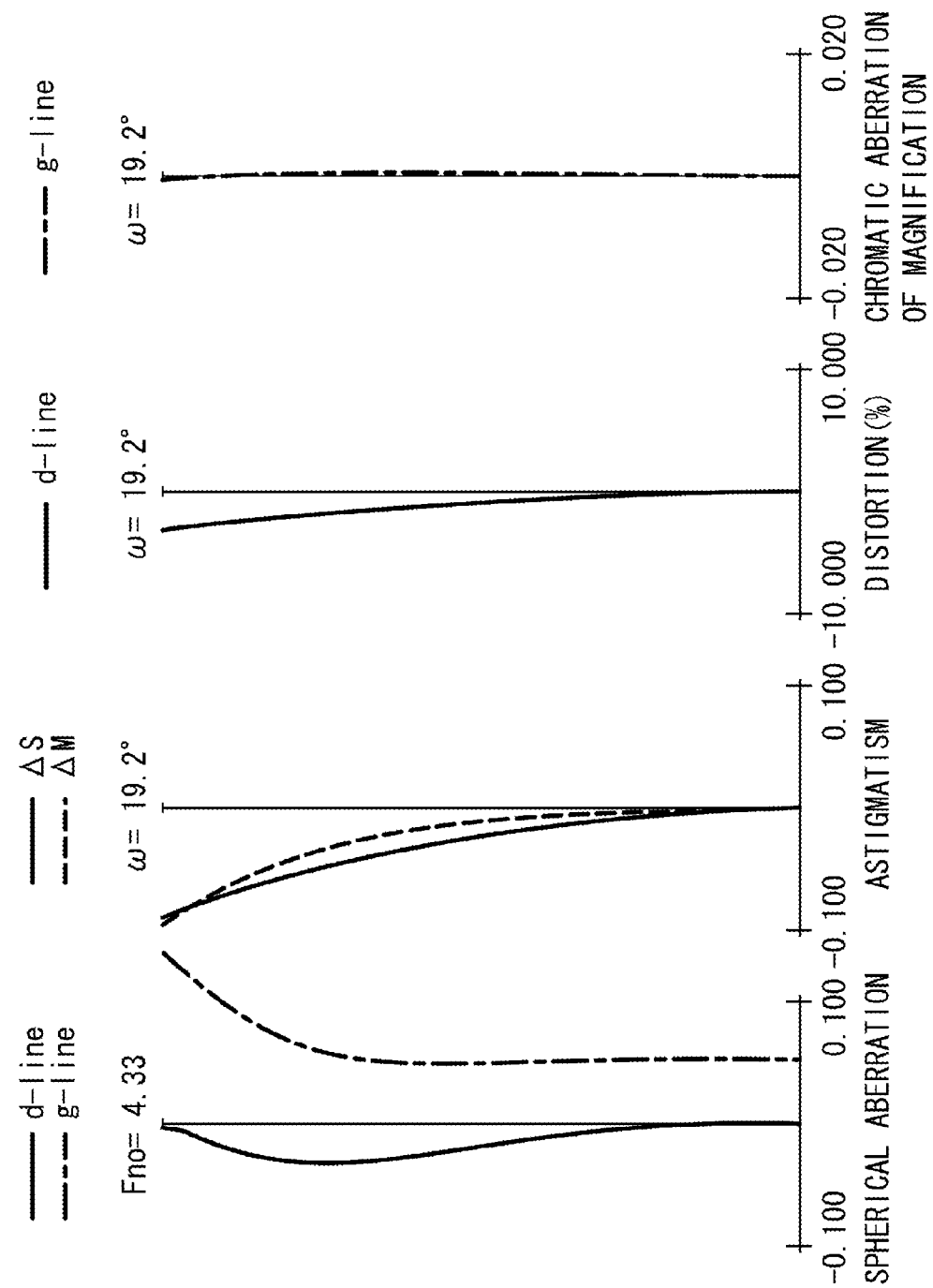
Figure 11:
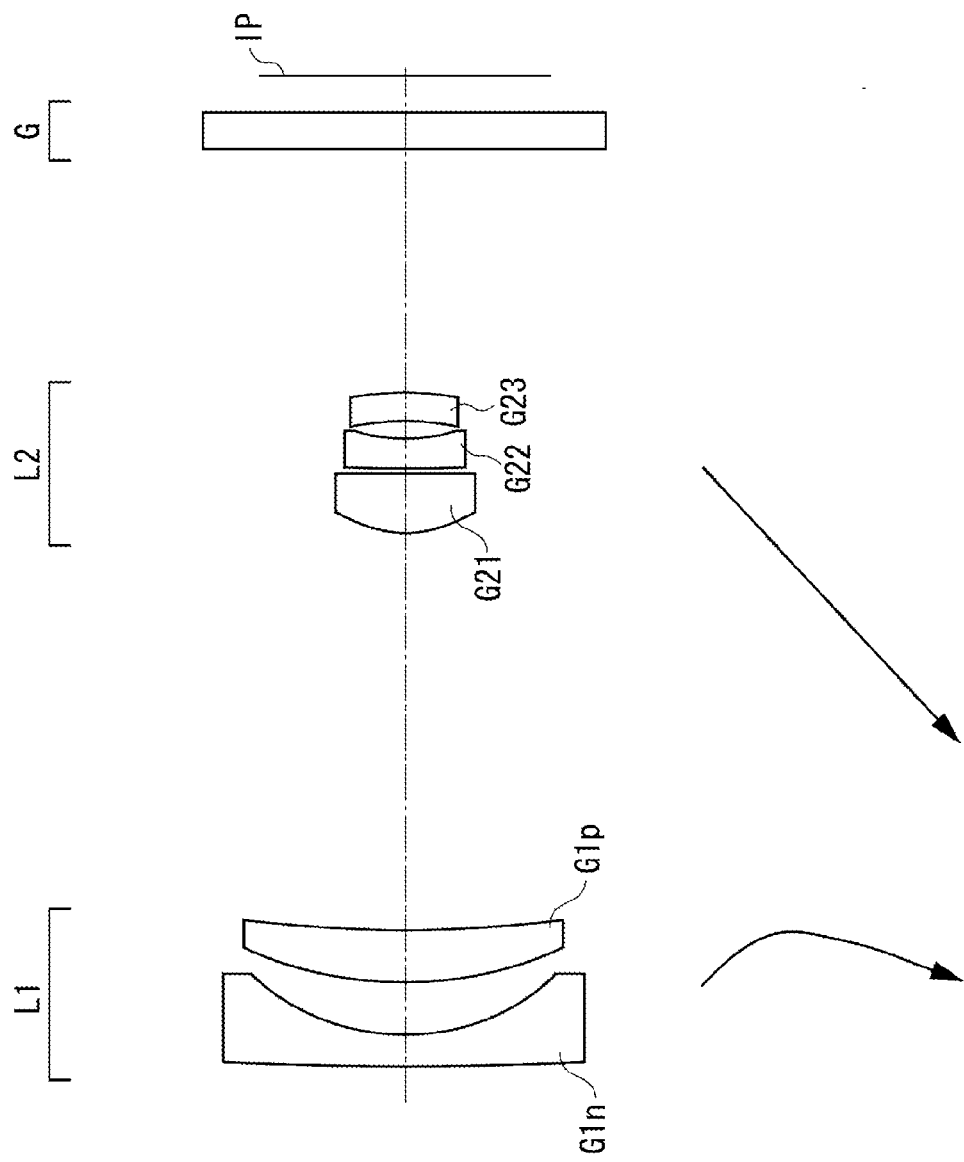
FIG. 11 is a lens cross-sectional view illustrating a zoom lens at a wide-angle end according to a sixth exemplary embodiment of the present invention.

FIG. 9 is a cross-sectional view illustrating a zoom lens at a wide-angle end according to a fifth exemplary embodiment of the present invention. FIGS. 10A, 10B, and 10C are aberration charts of the zoom lens at the wide-angle end, a middle zoom position, and a telephoto end according to the fifth exemplary embodiment, respectively. FIG. 11 is a cross-sectional view illustrating a zoom lens at a wide-angle end according to a sixth exemplary embodiment of the present invention. FIGS. 12A, 12B, and 12C are aberration charts of the zoom lens at the wide-angle end, a middle zoom position, and a telephoto end according to the sixth exemplary embodiment, respectively.

Figure 13:
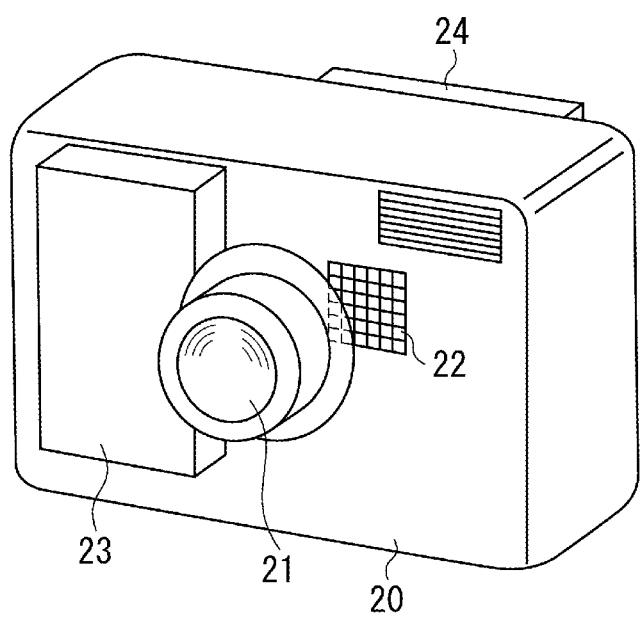
FIG. 13 is a schematic diagram illustrating main components of an image pickup apparatus according to an exemplary embodiment of the present invention.

FIG. 13 is a schematic diagram illustrating main components of a camera (image pickup apparatus) having a zoom lens according to an exemplary embodiment of the present invention.

The zoom lens of each exemplary embodiment is a photographic lens system used for an image pickup apparatus such as a video camera, a digital camera, and a silver-halide film camera. In the lens cross-sectional views, the left side is an object side (front side), and the right side is an image side (rear side). In addition, in the lens cross-sectional views, when i is the ordinal number of a lens unit from an object side, reference numeral "Li" denotes an i-th lens unit. Reference numeral "SP" denotes an aperture stop (F-number determining stop). Reference numeral "G" denotes an optical block corresponding to an optical filter, a face plate, a low pass filter, an infrared cutoff filter, or the like.

Reference numeral "IP" denotes an image plane. The image plane IP corresponds to an imaging surface of a solid-state image sensor (photoelectric conversion element) such as a CCD sensor or a CMOS sensor in the case where a zoom lens is used as a photographic optical system of a video camera or a digital camera. In the case where a zoom lens is used as a photographic optical system of a silver-halide film camera, the image plane IP corresponds to a film surface. Each arrow denotes a locus of movement of each lens unit during zooming from the wide-angle end to the telephoto end.

In the aberration charts, reference numeral "d" and "g" denote d-line and g-line, respectively, and reference numerals "ΔM" and "ΔS" denote a meridional image surface and a sagittal image surface, respectively. Chromatic aberration of magnification is indicated by g-line. Reference numeral "ω" denotes a half angle of view, and reference numeral "Fno" denotes an F-number.

In addition, in each exemplary embodiment, the wide-angle end and the telephoto end denote zoom positions when a lens unit (second lens unit L2) for variation of magnification is located at two mechanical ends of a movable range on an optical axis.

In the zoom lenses according to the first to fifth exemplary embodiments, during zooming from a wide-angle end to a telephoto end as zoom points, the first lens unit L1 substantially reciprocates along a portion of a locus which is convex toward the image side, so that variation of the image plane according to the variation of magnification is corrected. The second lens unit L2 is monotonously moved toward the object side to perform primary variation of magnification. The third lens unit L3 is moved to the object side or the image side. At this time, during zooming from the wide-angle end to the telephoto end, the lens units are moved so that the distance between the first lens unit L1 and the second lens unit L2 is decreased and the distance between the second lens unit L2 and the third lens unit L3 is increased.

The third lens unit is moved toward the object side to perform focusing on a near-distance object from an infinitely distant object. In the first to third exemplary embodiments, the F-number determining member (aperture stop) SP is located at the image side of the second lens unit L2 to be moved together with the second lens unit L2 during zooming. In the sixth exemplary embodiment, the zoom lens includes, in order from an object side to an image side, a first lens unit L1 having a negative refractive power and a second lens unit L2 having a positive refractive power. In addition, the first and second lens units are moved so that the distance between the first lens unit L1 and the second lens unit L2 is changed during zooming (variation of magnification).

More specifically, during zooming from the wide-angle end to the telephoto end, the first lens unit L1 is moved along a locus which is convex toward the image sides, and the second lens unit L2 is monotonously moved toward the object side. The first lens unit L1 is moved toward the image side to perform focusing on a near-distance object from an infinitely distant object. In a zoom lens according to each exemplary embodiment, the first lens unit L1 includes, in order from the object side to the image side, a negative lens G1n and a positive lens G1p of which the object-side lens surface has a convex shape.

An Abbe number of a material of the positive lens G1p of the first lens unit L1 is denoted by vd1p. A focal length of the first lens unit L1 is denoted by f1. A distance between the image-side lens surface of the first lens unit L1 and the object-side lens surface of the second lens unit L2 at the telephoto end is denoted by d12t. Focal lengths of the entire zoom lens at the wide-angle end and the telephoto end are denoted by fw and ft, respectively.

In that case, the following conditions are satisfied:

$$5.0 < vd1p < 16.9 \quad (1)$$

$$0.1 < (d12t/ft)*100 < 5.0 \quad (2)$$

$$1.9 < |f1|/fw < 2.4 \quad (3)$$

In each exemplary embodiment, the zoom lens includes, in order from an object side to an image side, a first lens unit L1 having a negative refractive power and a second lens unit L2 having a positive refractive power. In addition, the first and second lens units are moved so that the distance between the first lens unit L1 and the second lens unit L2 is changed during zooming. More specifically, during zooming from the wide-angle end to the telephoto end, the first lens unit L1 is moved along a locus which is convex toward the image side, and the second lens unit L2 is monotonously moved toward the object side.

To reduce the retraction thickness of the entire zoom lens, it is necessary to reduce the thickness of each lens unit. Particularly, in a negative lead type zoom lens where a lens unit having a negative refractive power is located at the leading position, it is important to miniaturize the first lens unit of which the effective diameter is increased and to reduce the thickness thereof. In the zoom lens according to each exemplary embodiment, the first lens unit L1 includes two lenses which are separated by an air distance, so that the thickness of the first lens unit L1 in the optical direction can be reduced while correcting chromatic aberration and curvature of field.

The condition (1) is a condition that defines Abbe number of a material of the positive lens G1p included in the first lens unit L1. As a material which satisfies the condition (1), there are, for example, $TiO_2$ (vd=9.53) and L-BBH1 (product name, manufactured by Ohara Inc.) (vd=16.8). The positive lens G1p used for the first lens unit L1 is configured by using a material having high dispersion which satisfies the condition (1), so that achromatism in the first lens unit is maintained, and the negative lens G1n constituting the pair is configured by using a material having higher dispersion.

In general, since an optical material represented by optical glass has a tendency in that the refractive index thereof is increased as the material has higher dispersion, a material having a high refractive index can be used for a negative lens. Therefore, the thickness of the first lens unit L1 is contrived to be reduced by disposing a material having a high refractive index in the first lens unit L1. The condition (2) is a condition that defines a distance between the first lens unit L1 and the second lens unit L2 at the telephoto end. In addition, the condition (3) is a condition that defines a refractive power of the first lens unit L1.

It is possible to secure a sufficiently large amount of movement of the second lens unit L2 toward the object side for zooming by reducing the distance between the first lens unit L1 and the second lens unit L2 at the telephoto end. As a result, it is possible to suppress the length of the entire zoom lens at the telephoto end from being increased while implementing a high zoom ratio.

In this case, if a physical F-number stop mechanism is disposed at the object side of the second lens unit L2, it is difficult to reduce the distance between the first lens unit L1 and the second lens unit L2 at the telephoto end in terms of the configuration thereof. On the other hand, in the case where an F-number stop is disposed at the image side of the second lens unit L2, the position of an entrance pupil is configured to be away toward the image side, and the effective diameter of the front lens tends to be increased. Therefore, to prevent the effective diameter of the front lens from being increased while disposing the F-number stop to the image side of the second lens unit L2, it is important to appropriately arrange the refractive power of the first lens unit L1.

Herein, in the case where the effective diameter of the front lens is reduced by increasing the refractive power of the first lens unit L1, a material having high dispersion can be used for the positive lens G1p included in the first lens unit L1.

According to this configuration, the refractive powers of the single units for achromatism in the first lens unit can be suitably distributed.

As a result, an increase in the lens thickness of the first lens unit due to an increase in the refractive power can be prevented. In other words, the entire zoom lens can be miniaturized easily and the thickness thereof can be decreased by taking the lens configuration satisfying the condition (2) and configuring the first lens unit L1 to have the refractive power satisfying the condition (3). Furthermore, the thickness of the first lens unit L1 can be easily decreased by satisfying the condition (1).

If the upper limit of the condition (1) is exceeded, Abbe number of a material of the positive lens G1p is increased, and in the case where a material having a high refractive index and high dispersion is used for a negative lens G1n constituting the pair, chromatic aberration is insufficiently corrected, which is not desirable. On the other hand, if the lower limit thereof is exceeded, Abbe number of a material of the positive lens G1p is decreased, so that chromatic aberration is over-corrected, which is not desirable. If the upper limit of the condition (2) is exceeded, the distance between the first lens unit L1 and the second lens unit L2 at the telephoto end is increased, so that the entire zoom lens is enlarged. On the other hand, if the lower limit thereof is exceeded, the distance is decreased, so that the first and second lens units interfere with each other in terms of the structure, which is not desirable.

If the upper limit of the condition (3) is exceeded, a focal length of the first lens unit L1 is increased, so that the effective diameter of the front lens is increased. On the other hand, if the lower limit thereof is exceeded, a focal length of the first lens unit L1 is decreased, so that it is difficult to correct curvature of field over the entire zoom range, which is not desirable. In each exemplary embodiment, more desirably, the numerical ranges of the conditions (1) to (3) may be set as follows:

$$8.0 < vd1p < 16.85 \quad (1a)$$

$$0.3 < (d12t/ft)*100 < 4.0 \quad (2a)$$

$$2.00 < |f1|/fw < 2.35 \quad (3a)$$

In each exemplary embodiment, more desirably, the numerical range of the conditions (1a) to (3a) may be set as follows:

$$10.0 < vd1p \leq 16.8 \quad (1b)$$

$$0.5 < (d12t/ft)*100 < 3.0 \quad (2b)$$

$$2.05 < |f1|/fw < 2.30 \quad (3b)$$

As described above, in the negative lead type zoom lens, the lens configurations of the first lens unit L1 and the second lens unit L2 are optimized. Accordingly, it is possible to obtain a zoom lens having a small thickness of the entire zoom lens during the retraction period, allowing various aberrations such as chromatic aberration and curvature of field to be well corrected over the entire zoom range, and having high optical characteristics.

Furthermore, in each zoom lens of each exemplary embodiment, it is more desirable that at least one of the following conditions be satisfied. Accordingly, the effects corresponding to the conditions can be obtained. Abbe number of a material of the negative lens G1n in the first lens unit L1 is denoted by vd1n. A radius of curvature of the object-side lens surface and a radius of curvature of the image-side lens surface of the negative lens G1n in the first lens unit L1 are denoted by R1na and R1nb, respectively. A radius of curvature of the object-side lens surface of the positive lens G1p in the first lens unit L1 is denoted by R1pa.

A focal length of the positive lens G1p in the first lens unit L1 is denoted by f1p. A focal length of the second lens unit L2 is denoted by f2. An amount of movement of the second lens unit L2 from the wide-angle end to the telephoto end during zooming is denoted by M2. Herein, the sign of the amount of movement M2 is set to be positive. A d-line refractive index of a material of the negative lens G1n in the first lens unit L1 is denoted by nd1n. In the case where a third lens unit having a positive refractive power is disposed at an image side of the second lens unit L2, a focal length of the third lens unit L3 is denoted by f3. In this case, at least one of the following conditions is satisfied:

$$-0.100 < [(R1nb+R1na)/(R1nb-R1na)]/(vd1n-vd1p) < -0.046 \quad (4)$$

$$3.0 < (R1pa+R1nb)/(R1pa-R1nb) < 6.0 \quad (5)$$

$$1.2 < f1p/f1 < 2.0 \quad (6)$$

$$1.2 < f2/fw < 2.3 \quad (7)$$

$$0.9 < |f1|/f2 < 1.6 \quad (8)$$

$$1.0 < M2/fw < 4.6 \quad (9)$$

$$1.86 < nd1n < 2.50 \quad (10)$$

$$20.0 < vd1n < 40.0 \quad (11)$$

$$4.1 < f3/fw < 6.5 \quad (12)$$

Next, technical meaning of each condition will be described.

The condition (4) is a condition that defines a balance between a lens shape of the negative lens G1n in the first lens unit L1 and achromatism in the first lens unit.

As described above, the Abbe number of a material of the positive lens G1p included in the first lens unit L1 is set to be within the range of the condition (1), so that the material of the negative lens G1n included in the first lens unit L1 may be allowed to have high dispersion while maintaining achromatism in the first lens unit L1. In this case, a material having a high refractive index can be used for the negative lens G1n included in the first lens unit L1, so that the thickness of the negative lens G1n having a large effective diameter, which has much influence on the lens thickness of the first lens unit L1, can be reduced. In this case, the lens configuration satisfying the condition (4) can be used, so that chromatic aberration in the first lens unit can be easily corrected while implementing the small thickness of the first lens unit L1.

If the upper limit of the condition (4) is exceeded, a difference of Abbe number of a material of each single lens in the first lens unit L1 is decreased, so that chromatic aberration in the first lens unit L1 is insufficiently corrected. In addition, the refractive power of each lens in the first lens unit L1 is increased, and the lens thickness of the first lens unit L1 is increased.

On the other hand, if the lower limit of the condition (4) is exceeded, it is difficult to select a material having a high refractive index for the negative lens G1n in the first lens unit L1, so that the negative lens G1n becomes an intensively-biconcave-shape lens. In this case, if a mechanically-reduced barrel structure is also taken into consideration, the lens thickness of the first lens unit L1 is increased, which is not desirable. The condition (5) is a condition that defines a shape of the air lens formed in the first lens unit L1. The shape of the air lens formed in the first lens unit L1 is configured as a shape satisfying the condition (5), so that chromatic aberration and curvature of field can be well corrected over the entire zoom range.

If the upper limit of the condition (5) is exceeded, a meniscus shape of the air lens is strengthened, a large amount of spherical aberration and axial chromatic aberration at the telephoto end occurs. On the other hand, if the lower limit of the condition (5) is exceeded, the meniscus shape of the air lens is weakened, a large amount of curvature of field, astigmatism, or the like at the wide-angle end occurs, which is not desirable.

The condition (6) is a condition that defines a focal length of the positive lens G1p included in the first lens unit L1. The positive lens G1p included in the first lens unit L1 is configured to have a focal length (reciprocal number of refractive power) satisfying the condition (6), so that chromatic aberration and curvature of field in the first lens unit L1 are uniformly corrected. If the upper limit of the condition (6) is exceeded, the focal length of the positive lens G1p is increased, so that chromatic aberration and curvature of field are insufficiently corrected. On the other hand, if the lower limit of the condition (6) is exceeded, the focal length of the positive lens G1p is decreased, so that chromatic aberration and curvature of field are over-corrected, which is not desirable.

The condition (7) is a condition that defines a focal length of the second lens unit L2. The second lens unit L2 is configured to have a focal length satisfying the condition (7), so that the entire zoom lens can be miniaturized while allowing spherical aberration and coma to be well corrected over the entire zoom range. If the upper limit of the condition (7) is exceeded, the focal length of the second lens unit L2 is increased. Therefore, the zoom stroke of the second lens unit L2 for zooming is increased, so that the size of the entire zoom lens is increased. On the other hand, if the lower limit of the condition (7) is exceeded, the focal length of the second lens unit L2 is decreased, so that it is difficult to allow spherical aberration and coma to be well corrected over the entire zoom range.

The condition (8) is a condition that defines a ratio of focal lengths of the first lens unit L1 and the second lens unit L2. The focal lengths of the first and second lens units L1 and L2 constituting the zoom lens are configured with a power arrangement satisfying the condition (8), so that the entire zoom lens can be miniaturized and good optical characteristics can be obtained over the entire zoom range. If the upper limit of the condition (8) is exceeded, the focal length of the first lens unit L1 is increased in comparison with the second lens unit L2, so that the effective diameter of the front lens is increased. Accordingly, the size of the entire zoom lens is increased. Otherwise, it is difficult to allow spherical aberration and coma to be well corrected over the entire zoom range.

On the other hand, if the lower limit of the condition (8) is exceeded, the focal length of the first lens unit L1 is decreased in comparison with the second lens unit L2, so that it is difficult to allow curvature of field to be corrected over the entire zoom range. Otherwise, the zoom stroke of the second lens unit L2 for zooming is increased, so that the size of the entire zoom lens is increased, which is not desirable. The condition (9) is a condition that defines a moving distance (amount of movement; sign is positive) according to the zooming of the second lens unit L2.

If the upper limit of the condition (9) is exceeded, the moving distance of the second lens unit L2 is increased, the thickness of a lens barrel supporting the second lens unit L2 in the direction of the optical axis is increased. Particularly, in the case of a retractable lens barrel, the retraction length is increased, so that it is difficult to configure an image pickup apparatus of which the thickness in the direction of the optical axis is reduced.

On the other hand, if the lower limit of the condition (9) is exceeded, the moving distance of the second lens unit L2 is decreased, it is necessary to strengthen the refractive power of the second lens unit L2 to obtain a desired zoom ratio. In this case, it is difficult to perform the correction of aberration by using a small number of lens elements, so that it is difficult to miniaturize the entire zoom lens and to obtain high performance thereof.

The condition (10) is a condition that defines an Abbe number of a material of the negative lens G1n of the first lens unit L1. In the case where a material of the positive lens G1p included in the first lens unit L1 is set to be in the range satisfying the condition (1), Abbe number of a material of the negative lens G1n is in the range satisfying the condition (10), so that chromatic aberration is well corrected over the entire zoom range. If the upper limit of the condition (10) is exceeded, Abbe number of the negative lens G1n is increased, so that chromatic aberration of the first lens unit is over-corrected. Therefore, it is difficult to correct chromatic aberration over the entire zoom range. On the other hand, if the lower limit of the condition (10) is exceeded, the Abbe number of the negative lens G1n is decreased, so that chromatic aberration of the first lens unit is insufficiently corrected, which is not desirable.

The condition (11) is a condition that defines a d-line refractive index of a material of the negative lens G1n of the first lens unit L1. The d-line refractive index of a material of the negative lens G1n is set to be in the range satisfying the condition (11), so that curvature of field and astigmatism at the wide-angle end can be corrected and the entire zoom lens can be miniaturized. If the upper limit of the condition (11) is exceeded, the refractive index of the negative lens G1n is increased, so that Petzval sum is biased toward a positive value, so that it is difficult to correct curvature of field over the entire zoom range. On the other hand, if the lower limit of the condition (11) is exceeded, the refractive index of the negative lens G1n is decreased, so that it is difficult to correct curvature of field and astigmatism at the wide-angle end, and the size of the entire zoom lens is increased, which his not desirable.

In addition, in each of the first to fifth exemplary embodiments, a third lens unit L3 having a positive refractive power is disposed at an image side of the second lens unit L2. The third lens unit L3 having a positive refractive power is disposed at the image side of the second lens unit L2, so that the zoom lens has also a function as a field lens for securing telecentricity. The condition (12) is a condition that defines a focal length of the third lens unit L3. If the upper limit of the condition (12) is exceeded, the focal length of the third lens unit L3 is increased, so that a function of refracting an off-axis light flux is weakened. Therefore, the effect of securing the telecentricity is decreased.

On the other hand, if the lower limit of the condition (12) is exceeded, the focal length of the third lens unit L3 is decreased, so that a large amount of chromatic aberration of magnification and curvature of field occurs from the third lens unit L3, and the back focus is shortened, which is not desirable. In each exemplary embodiment, more desirably, the numerical ranges of the conditions (4) to (12) are set as follows:

$$-0.095 < [(R1nb+R1na)/(R1nb-R1na)]/(vd1n-vd1p) < -0.048 \quad (4a)$$

$$3.1 < (R1pa+R1nb)/(R1pa-R1nb) < 5.7 \quad (5a)$$

$$1.25 < |f1p|/f2 < 1.90 \quad (6a)$$

$$1.3 < f2/fw < 2.2 \quad (7a)$$

$$1.0 < |f1|/f2 < 1.5 \quad (8a)$$

$$1.1 < M2/fw < 4.5 \quad (9a)$$

$$1.89 < nd1n < 2.40 \quad (10a)$$

$$24.0 < vd1n < 39.0 \quad (11a)$$

$$4.2 < f3/fw < 6.4 \quad (12a)$$

In each exemplary embodiment, more desirably, the numerical ranges of the conditions (4a) to (12a) are set as follows:

$$-0.09 < [(R1nb+R1na)/(R1nb-R1na)]/(vd1n \cdot vd1p) < -0.05 \quad (4b)$$

$$3.3 < (R1pa+R1nb)/(R1pa-R1nb) < 5.4 \quad (5b)$$

$$1.3 < |f1p|/f2 < 1.8 \quad (6b)$$

$$1.4 < f2/fw < 2.1 \quad (7b)$$

$$1.05 < |f1|/f2 < 1.45 \quad (8b)$$

$$1.2 < M2/fw < 4.4 \quad (9b)$$

$$1.90 < nd1n < 2.3 \quad (10b)$$

$$27.0 < vd1n < 38.0 \quad (11b)$$

$$4.3 < f3/fw < 6.3 \quad (12b)$$

In addition, in each exemplary embodiment, any one of lens units or some of the lens units are movable to have a component in the direction perpendicular to the optical axis, so that the lens units may be used as an image stabilization lens unit which corrects an image shift occurring due to camera shake. In each exemplary embodiment, it is desirable that the second lens unit L2 is used as an image stabilization lens unit.

In addition, in each exemplary embodiment, in the case where an electronic image sensor (solid-state image sensor) is used as an image sensor, distortion may be electronically corrected.

As described above, according to each exemplary embodiment, a zoom lens can be obtained which can easily reduce the size of the entire zoom lens and easily reduce the retraction thickness thereof without increasing the effective diameter of the front lens. Furthermore, a zoom lens can be obtained which have well-corrected aberrations, such as chromatic aberration and curvature of field, and good optical characteristics over the entire zoom range. Hereinafter, the lens configuration of each exemplary embodiment will be described.

First Exemplary Embodiment

In a first exemplary embodiment illustrated in FIG. 1, during zooming from the wide-angle end to the telephoto end, as indicated by the arrow, the first lens unit L1 is moved along a locus which is convex toward the image side, so that the variation of the image plane due to the variation of magnification is corrected. In addition, the second lens unit L2 and the third lens unit L3 are lens units for variation of magnification, which are moved toward the object side and toward the image side, respectively. A rear focus type where the third lens unit L3 is moved toward the object side along the optical axis is employed on focusing from an infinitely distant object to a finite distance object. The light-weighted third lens unit L3 is used as a focusing lens unit, so that it is possible to easily perform focusing at a high speed.

Hereinafter, the lens configuration of each lens unit is arranged in order from the object side to the image side. The first lens unit L1 includes two lenses of a biconcave-shaped negative lens G1n of which the two lens surfaces are aspheric and a meniscus-shaped positive lens G1p which is convex toward the object side. According to this lens configuration, chromatic aberration and curvature of field are well corrected, and the first lens unit L1 includes the minimum number of lens elements, so that effective diameter of the front lens and the lens thickness of the first lens unit L1 are contrived to be reduced. Furthermore, the negative lens G1n of the first lens unit L1 is configured by using a material having a high refractive index and high dispersion, and the positive lens G1p is configured by using a material having a high refractive index and high dispersion, so that the thickness of each lens can be reduced while correcting chromatic aberration.

The second lens unit L2 includes four lenses of a meniscus-shaped positive lens G21 of which the object-side lens surface is aspheric and which is convex toward the object side, a cemented lens formed by cementing a biconvex-shaped positive lens G22 and a biconcave-shaped negative lens G23, and a biconvex-shaped positive lens G24. According to this configuration, the occurrence of chromatic aberration and off-axis aberration is reduced, so that spherical aberration, coma, or the like is allowed to be well corrected over the entire zoom range. In addition, an F-number stop (aperture stop) SP is disposed at an image side of the second lens unit L2. The aperture stop SP is disposed at this position, so that the distance between the first lens unit L1 and the second lens unit L2 at the telephoto end can be shortened.

According to this lens configuration, the second lens unit L2 can secure a sufficiently large amount of movement toward the object side for zooming, so that an increase in the size of the entire zoom lens at the telephoto end can be prevented while maintaining a high zoom ratio. Herein, the minimum F-number of each zoom position is determined by changing the stop value of the F-number stop SP of each zoom position. According to this lens configuration, since the F-numbers of the wide-angle end and the telephoto end can be individually set, a change in the F-numbers of the wide-angle end and the telephoto end can be reduced and the effective diameter of the second lens unit L2 can be prevented from increasing.

The third lens unit L3 includes a biconvex-shaped positive lens G31 of which the object-side lens surface is aspheric. According to this lens configuration, telecentricity is secured while allowing the variation of magnification to be shared, so that the thickness of the third lens unit L3 can be reduced.

Second Exemplary Embodiment

In a second exemplary embodiment illustrated in FIG. 3, the zoom type and the focusing method are the same as those of the first exemplary embodiment illustrated in FIG. 1. The second exemplary embodiment is different from the first exemplary embodiment in that the lens shape in each lens unit is changed. Hereinafter, the lens configuration of each lens unit is arranged in order from the object side to the image side. The first lens unit L1 includes two lenses of a biconcave-shaped negative lens G1n of which the image-side lens surface is aspheric and a meniscus-shaped positive lens G1p which is convex toward the object side.

The second lens unit L2 includes four lenses of a biconvex-shaped positive lens G21 of which the object-side lens surface is aspheric, a cemented lens formed by cementing a biconvex-shaped positive lens G22 and a biconcave-shaped negative lens G23, and a meniscus-shaped positive lens G24 which is concave toward the object side. The third lens unit L3 includes a biconvex-shaped positive lens G31 of which the object-side lens surface is aspheric.

Third Exemplary Embodiment

In a third exemplary embodiment illustrated in FIG. 5, the zoom type and the focusing method are the same as those of the first exemplary embodiment illustrated in FIG. 1. The third exemplary embodiment is different from the first exemplary embodiment in that the lens shape in each lens unit is changed. The first lens unit L1 includes two lenses of a biconcave-shaped negative lens G1n of which the two lens surfaces are aspheric and a meniscus-shaped positive lens G1p which is convex toward the object side. The second lens unit L2 includes four lenses of a meniscus-shaped positive lens G21 of which the object-side lens surface is aspheric and which is convex toward the object side, a cemented lens formed by cementing a biconvex-shaped positive lens G22 and a biconcave-shaped negative lens G23, and a biconvex-shaped positive lens G24.

In addition, an F-number stop SP is disposed at the image side of the second lens unit L2. The third lens unit L3 includes a meniscus-shaped positive lens G31 of which the object-side lens surface is aspheric and which is convex toward the object side.

Fourth Exemplary Embodiment

In a fourth exemplary embodiment illustrated in FIG. 7, the zoom type and the focusing method are the same as those of the first exemplary embodiment illustrated in FIG. 1. The fourth exemplary embodiment is different from the first exemplary embodiment in terms of the zoom ratio, the lens shape in each lens unit, the lens configuration of the second lens unit, the locus of movement of the third lens unit during zooming, and the like. In the fourth exemplary embodiment illustrated in FIG. 7, during zooming from the wide-angle end to the telephoto end, as indicated by the arrow, the first lens unit L1 is moved along a locus which is convex toward the image side, so that the variation of the image plane due to the variation of magnification is corrected. In addition, the second lens unit L2 and the third lens unit L3 are lens units for variation of magnification, which are moved toward the object side.

Hereinafter, the lens configuration of each lens unit is arranged in order from the object side to the image side. The first lens unit L1 includes two lenses of a meniscus-shaped negative lens G1n of which the image-side lens surface is aspheric and which is convex toward the object side and a meniscus-shaped positive lens G1p which is convex toward the object side.

The second lens unit L2 includes three lenses of a cemented lens formed by cementing a meniscus-shaped positive lens G21 of which the object-side lens surface is aspheric and which is convex toward the object side and a meniscus-shaped negative lens G22 which is convex toward the object side and a biconvex-shaped positive lens G23. According to this configuration, the occurrence of chromatic aberration and off-axis aberration is reduced, so that spherical aberration, coma, or the like in the entire zoom range is allowed to be well corrected.

In addition, no F-number stop (aperture stop) SP is disposed in the second lens unit L2. According to this configuration, the distance between the first lens unit L1 and the second lens unit L2 at the telephoto end is reduced, so that the second lens unit L2 can secure a sufficiently large amount of movement toward the object side for the variation of magnification. Therefore, the size of the entire zoom lens can be prevented from increasing at the telephoto end while maintaining a high zoom ratio. The third lens unit L3 includes a biconvex-shaped positive lens G31.

Fifth Exemplary Embodiment

In a fifth exemplary embodiment illustrated in FIG. 9, the zoom type and the focusing method are the same as those of the first exemplary embodiment illustrated in FIG. 1. The fifth exemplary embodiment is different from the first exemplary embodiment in terms of the zoom ratio, the lens shape in each lens unit, the lens configuration of the second lens unit, and the like. Hereinafter, the lens configuration of each lens unit is arranged in order from the object side to the image side.

The first lens unit L1 includes two lenses of a meniscus-shaped negative lens G1n of which the image-side lens surface is aspheric and which is convex toward the object side and a meniscus-shaped positive lens G1p which is convex toward the object side. The second lens unit L2 includes three lenses of a cemented lens formed by cementing a biconvex-shaped positive lens G21 of which the object-side lens surface is aspheric and a biconcave-shaped negative lens G22 and a biconvex-shaped positive lens G23. The third lens unit L3 includes a biconvex-shaped positive lens G31.

Sixth Exemplary Embodiment

In a sixth exemplary embodiment illustrated in FIG. 11, a zoom lens is a two-unit zoom lens including, in order from an object side to an image side, a first lens unit L1 having a negative refractive power and a second lens unit L2 having a positive refractive power. In the sixth exemplary embodiment illustrated in FIG. 11, during zooming from the wide-angle end to the telephoto end, as indicated by the arrow, the first lens unit L1 is moved along a locus which is convex toward the image side, so that the variation of the image plane due to the variation of magnification is corrected. In addition, the second lens unit L2 is a lens unit for variation of magnification, which is monotonously moved toward the object side. A front-lens focus type where the first lens unit L1 is moved along the optical axis is employed on focusing from the infinitely distant object to the finite distance object.

Hereinafter, the lens configuration of each lens unit is arranged in order from the object side to the image side. The first lens unit L1 includes two lenses of a meniscus-shaped negative lens G1n which is convex toward the object side and a meniscus-shaped positive lens G1p of which the object-side lens surface is aspheric and which is convex toward the object side.

The second lens unit L2 includes three lenses of a biconvex-shaped positive lens G21 of which the two lens surfaces are aspheric, a meniscus-shaped negative lens G22 of which the image-side lens surface is aspheric and which is convex toward the object side, and a meniscus-shaped positive lens G23 which is concave toward the object side. The occurrence of chromatic aberration and asymmetric aberration due to the second lens unit L2 for the variation of magnification is reduced by configuring the second lens unit L2 as a triplet type of positive, negative, and positive lenses, so that spherical aberration, coma, or the like is allowed to be well corrected over the entire zoom range.

Hereinafter, in each exemplary embodiment, in the case where a lens constituting the zoom lens is a composite aspheric lens, a lens base material providing a main refractive power and an aspheric component (for example, a resin), which is cemented to the lens base material to form an aspheric surface, are counted as one lens. Therefore, this configuration is distinguished from a cemented lens formed by cementing two lens base materials having main refractive powers. A focal length of the entire composite aspheric lens is denoted by fcom. A focal length of an individual aspheric component constituting the composite aspheric lens is denoted by frep. In this case, the composite aspheric lens satisfies the following condition:

$|fcom/frep|<0.3$

In addition, a central thickness from an object-side lens surface to an image-side lens surface of the entire composite aspheric lens is denoted by dcem. A central thickness from an object-side lens surface to an image-side lens surface of the aspheric component of the composite aspheric lens is denoted by drep. In this case, the composite aspheric lens satisfies the following condition:

$drep/dcom<0.5$

In addition, the image-side lens surface and the object-side lens surface are in contact with air. In addition, it is assumed that, in the case where the lens surface has an aspheric shape, a radius of curvature of each lens surface is a paraxial radius of curvature.

Hereinbefore, although the exemplary embodiments of the present invention are described, the present invention is not limited to the exemplary embodiments, but various modifications and changes can be made within the scope and the spirit of the present invention. Hereinafter, specific numerical data of Numerical Examples 1 to 6 corresponding to the first to sixth exemplary embodiments are described. In each numerical example, an ordinal number of a surface from the object side is denoted by i. A radius of curvature of the i-th optical surface (i-th surface) is denoted by ri. An axial distance between the i-th surface and the (i+1)th surface is denoted by di. A refractive index and Abbe number of a material of the i-th optical member with respect to d-line is denoted by ndi and vdi, respectively. A focal length, an F-number, and a half angle of view are denoted by f, Fno, and ω, respectively.

When the propagation of light is set to be positive, an amount of displacement from a surface vertex in the direction of the optical axis is denoted by x, a height from the optical axis in the direction perpendicular to the optical axis is denoted by h, a paraxial radius of curvature is denoted by r, a conic constant is denoted by K, and aspheric coefficients are denoted by A4, A6, A8, and A10, the aspheric shape can be expressed by the following equation:

$$x=(h^2/r)/[1+\{1-(1+K)*(h/r)^2\}^{1/2}]+A4*h^4+A6*h^6+A8*h^8+A10*h^{10}$$

In addition, in each aspheric coefficient, "E±XX" denotes "×10$^{\pm XX}$". In addition, the relationship between the aforementioned conditions and Numerical Examples 1 to 6 is listed in Table-1.

Numerical Example 1

Unit: mm

Data of surface

| Surface number | r | d | nd | vd | Effective diameter |
|---|---|---|---|---|---|
| 1* | −481.789 | 1.05 | 1.91082 | 35.3 | 13.08 |
| 2* | 5.550 | 1.82 | | | 10.05 |
| 3 | 9.397 | 1.52 | 2.10225 | 16.8 | 10.30 |

-continued

Unit: mm

| 4 | 16.651 | (Variable) | | | 9.91 |
|---|---|---|---|---|---|
| 5* | 5.797 | 1.56 | 1.84954 | 40.1 | 4.84 |
| 6 | 117.422 | 0.20 | | | 4.61 |
| 7 | 7.626 | 1.10 | 1.6968 | 55.5 | 4.43 |
| 8 | −27.267 | 0.40 | 1.80518 | 25.4 | 4.11 |
| 9 | 3.934 | 0.86 | | | 3.71 |
| 10 | 974.786 | 0.90 | 1.6968 | 55.5 | 3.74 |
| 11 | −13.197 | 0.50 | | | 3.77 |
| 12 (Stop) | ∞ | (Variable) | | | 3.69 |
| 13* | 51.173 | 1.70 | 1.69350 | 53.2 | 8.83 |
| 14 | −20.163 | (Variable) | | | 8.94 |
| 15 | ∞ | 0.80 | 1.51633 | 64.1 | 20.00 |
| 16 | ∞ | | | | 20.00 |
| Image plane | ∞ | | | | |

Aspheric surface data

1st surface

K = 0.00000e+000  A4 = 1.35727e−006  A6 = 1.47334e−006
A8 = −1.42102e−008

2nd surface

K = −2.42900e+000  A4 = 1.32442e−003  A6 = −1.73040e−005
A8 = 4.97598e−007  A10 = −5.26310e−009

5th surface

K = −2.55852e−001  A4 = −3.19809e−004  A6 = −7.69713e−006
A8 = 5.94453e−007  A10 = −5.01903e−008

13th surface

K = −8.31012e+002  A4 = 4.71327e−004  1A6 = −3.30079e−005
A8 = 1.21214e−006  A10 = −1.84005e−008

Various data
Zoom ratio: 4.70

| | Wide-angle | Medium-angle | Telephoto |
|---|---|---|---|
| Focal length | 4.43 | 12.57 | 20.85 |
| F-number | 2.88 | 4.53 | 6.18 |
| Angle of view | 41.17 | 17.13 | 10.53 |
| Image height | 3.88 | 3.88 | 3.88 |
| Total lens length | 32.58 | 31.52 | 38.68 |
| BF | 1.00 | 1.00 | 1.00 |
| d4 | 13.23 | 2.75 | 0.48 |
| d12 | 3.32 | 12.88 | 22.44 |
| d14 | 2.63 | 2.49 | 2.35 |
| Position of entrance pupil | 7.11 | 5.87 | 5.45 |
| Position of exit pupil | −8.44 | −41.73 | 228.71 |
| Front principal point position | 9.46 | 14.75 | 28.21 |
| Rear principal point position | −3.43 | −11.57 | −19.85 |

Data of zoom lens unit

| Unit | Leading surface | Focal length | Lens structure length | Front principal point position | Rear principal point position |
|---|---|---|---|---|---|
| 1 | 1 | −9.98 | 4.39 | −0.01 | −3.12 |
| 2 | 5 | 9.15 | 5.52 | −0.91 | −4.63 |
| 3 | 13 | 21.06 | 1.70 | 0.73 | −0.29 |
| G | 15 | ∞ | 0.80 | 0.26 | −0.26 |

Data of single lens

| Lens | Leading surface | Focal length |
|---|---|---|
| 1 | 1 | −6.02 |
| 2 | 3 | 17.63 |
| 3 | 5 | 7.13 |
| 4 | 7 | 8.66 |
| 5 | 8 | −4.25 |
| 6 | 10 | 18.69 |
| 7 | 14 | 21.06 |

Numerical Example 2

Unit: mm

Data of surface

| Surface number | r | d | nd | νd | Effective diameter |
|---|---|---|---|---|---|
| 1 | −321.478 | 1.05 | 2.08200 | 30.4 | 13.10 |
| 2* | 5.979 | 1.57 | | | 10.00 |
| 3 | 10.908 | 1.65 | 2.18013 | 15.5 | 10.20 |
| 4 | 28.499 | (Variable) | | | 9.90 |
| 5* | 7.380 | 1.47 | 1.84954 | 40.1 | 5.10 |
| 6 | −155.074 | 0.20 | | | 4.80 |
| 7 | 5.759 | 1.58 | 1.69680 | 55.5 | 4.60 |
| 8 | −18.858 | 0.40 | 1.80518 | 25.4 | 4.30 |
| 9 | 3.810 | 0.91 | | | 3.80 |
| 10 | −22.397 | 0.87 | 1.69680 | 55.5 | 3.90 |
| 11 | −9.861 | 0.50 | | | 3.90 |
| 12 (Stop) | ∞ | (Variable) | | | 10.00 |
| 13* | 57.572 | 1.43 | 1.69350 | 53.2 | 8.90 |
| 14 | −17.590 | (Variable) | | | 9.00 |
| 15 | ∞ | 0.80 | 1.51633 | 64.1 | 20.00 |
| 16 | ∞ | | | | 20.00 |
| Image plane | ∞ | | | | |

Aspheric surface data

2nd surface $K = -2.64766e+000 \quad A4 = 1.12719e-003 \quad A6 = -2.23160e-005$
$A8 = 5.79278e-007 \quad A10 = -8.21851e-009$ 5th surface $K = 2.09358e-001 \quad A4 = -3.46638e-004 \quad A6 = -6.26850e-006$
$A8 = 2.56315e-007 \quad A10 = -1.19124e-008$ 13th surface $K = -2.05086e+003 \quad A4 = 4.20507e-004 \quad A6 = -3.30081e-005$
$A8 = 1.21213e-006 \quad A10 = -1.79862e-008$

Various data
Zoom ratio: 4.74

| | Wide-angle | Medium-angle | Telephoto |
|---|---|---|---|
| Focal length | 4.43 | 9.10 | 21.02 |
| F-number | 2.88 | 4.53 | 6.18 |
| Angle of view | 41.15 | 23.07 | 10.44 |
| Image height | 3.88 | 3.88 | 3.88 |
| Total lens length | 32.16 | 29.28 | 38.49 |
| BF | 0.99 | 0.99 | 0.99 |
| d4 | 13.09 | 4.83 | 0.40 |
| d12 | 3.15 | 8.53 | 22.27 |
| d14 | 2.49 | 2.49 | 2.39 |
| Position of entrance pupil | 6.96 | 6.16 | 5.49 |
| Position of exit pupil | −7.94 | −20.50 | 131.17 |
| Front principal point position | 9.19 | 11.40 | 29.91 |
| Rear principal point position | −3.45 | −8.11 | −20.03 |

Data of zoom lens unit

| Unit | Leading surface | Focal length | Lens structure length | Front principal point position | Rear principal point position |
|---|---|---|---|---|---|
| 1 | 1 | −10.03 | 4.28 | −0.30 | −3.27 |
| 2 | 5 | 9.07 | 5.94 | −1.20 | −5.03 |
| 3 | 13 | 19.58 | 1.43 | 0.65 | −0.20 |
| G | 15 | ∞ | 0.80 | 0.26 | −0.26 |

Data of single lens

| Lens | Leading surface | Focal length |
|---|---|---|
| 1 | 1 | −5.42 |
| 2 | 3 | 14.25 |
| 3 | 5 | 8.33 |
| 4 | 7 | 6.50 |
| 5 | 8 | −3.91 |
| 6 | 10 | 24.58 |
| 7 | 14 | 19.58 |

Numerical Example 3

Unit: mm

Data of surface

| Surface number | r | d | nd | νd | Effective diameter |
|---|---|---|---|---|---|
| 1* | −178.613 | 1.05 | 1.98500 | 29.1 | 12.15 |
| 2* | 5.772 | 1.65 | | | 9.82 |
| 3 | 10.309 | 1.52 | 2.19400 | 14.6 | 10.06 |
| 4 | 20.335 | (Variable) | | | 9.70 |
| 5* | 5.420 | 1.47 | 1.85135 | 40.1 | 4.89 |
| 6 | 36.506 | 0.20 | | | 4.65 |
| 7 | 5.766 | 1.05 | 1.59201 | 67.0 | 4.46 |
| 8 | −116.735 | 0.40 | 1.80518 | 25.4 | 4.15 |
| 9 | 3.635 | 0.82 | | | 3.73 |
| 10 | 54.983 | 0.97 | 1.72916 | 54.7 | 3.77 |
| 11 | −14.049 | 0.50 | | | 3.80 |
| 12 (Stop) | ∞ | (Variable) | | | 3.72 |
| 13* | −400.624 | 1.41 | 1.69680 | 55.5 | 8.10 |
| 14 | −18.470 | (Variable) | | | 8.26 |
| 15 | ∞ | 0.80 | 1.51633 | 64.1 | 20.00 |
| 16 | ∞ | | | | 20.00 |
| Image plane | ∞ | | | | |

Aspheric surface data

1st surface $K = 0.00000e+000 \quad A4 = 5.65184e-005 \quad A6 = -1.21487e-006$
$A8 = -3.18748e-009$ 2nd surface $K = -7.00756e-001 \quad A4 = 2.62039e-005 \quad A6 = 3.49027e-006$
$A8 = -2.61856e-007 \quad A10 = 1.51007e-009$ 5th surface $K = -2.84282e-001 \quad A4 = -2.69892e-004 \quad A6 = 1.85259e-006$
$A8 = -8.89015e-007 \quad A10 = 6.29859e-008$ 13th surface $K = -1.58781e+004 \quad A4 = -1.79084e-004 \quad A6 = 1.75362e-005$
$A8 = -1.11533e-006 \quad A10 = 2.74547e-008$

Various data
Zoom ratio: 4.83

| | Wide-angle | Medium-angle | Telephoto |
|---|---|---|---|
| Focal length | 4.43 | 12.99 | 21.40 |
| F-number | 2.88 | 4.33 | 6.18 |
| Angle of view | 41.18 | 16.61 | 10.26 |
| Image height | 3.88 | 3.88 | 3.88 |
| Total lens length | 31.53 | 30.32 | 37.52 |
| BF | 1.00 | 1.00 | 1.00 |
| d4 | 12.89 | 2.33 | 0.18 |
| d12 | 2.75 | 11.89 | 21.03 |
| d14 | 3.05 | 3.26 | 3.47 |
| Position of entrance pupil | 6.82 | 5.61 | 5.21 |
| Position of exit pupil | −7.70 | −27.38 | −108.00 |
| Front principal point position | 9.00 | 12.65 | 22.41 |
| Rear principal point position | −3.43 | −11.99 | −20.40 |

-continued

Unit: mm

Data of zoom lens unit

| Unit | Leading surface | Focal length | Lens structure length | Front principal point position | Rear principal point position |
|---|---|---|---|---|---|
| 1 | 1 | −9.64 | 4.23 | −0.09 | −3.02 |
| 2 | 5 | 8.77 | 5.40 | −0.83 | −4.54 |
| 3 | 13 | 27.75 | 1.41 | 0.87 | 0.04 |
| G | 15 | ∞ | 0.80 | 0.26 | −0.26 |

Data of single lens

| Lens | Leading surface | Focal length |
|---|---|---|
| 1 | 1 | −5.66 |
| 2 | 3 | 16.17 |
| 3 | 5 | 7.32 |
| 4 | 7 | 9.31 |
| 5 | 8 | −4.37 |
| 6 | 10 | 15.44 |
| 7 | 14 | 27.75 |

Numerical Example 4

Unit: mm

Data of surface

| Surface number | r | d | nd | vd | Effective diameter |
|---|---|---|---|---|---|
| 1 | 60.111 | 1.05 | 1.91082 | 35.3 | 11.05 |
| 2* | 4.938 | 1.40 | | | 8.48 |
| 3 | 7.301 | 1.44 | 2.10225 | 16.8 | 8.54 |
| 4 | 11.655 | (Variable) | | | 8.02 |
| 5* | 3.781 | 1.75 | 1.85135 | 40.1 | 3.94 |
| 6 | 11.461 | 0.50 | 1.92286 | 20.9 | 3.45 |
| 7 | 3.303 | 0.65 | | | 3.17 |
| 8 | 9.556 | 1.02 | 1.77250 | 49.6 | 3.29 |
| 9 | −16.295 | (Variable) | | | 3.30 |
| 10 | 24.649 | 1.34 | 1.60311 | 60.6 | 8.17 |
| 11 | −35.341 | (Variable) | | | 8.20 |
| 12 | ∞ | 0.80 | 1.51633 | 64.1 | 20.00 |
| 13 | ∞ | | | | 20.00 |
| Image plane | ∞ | | | | |

Aspheric surface data

2nd surface

K = −1.01391e+000  A4 = 6.34824e−004  A6 = 9.99188e−006
A8 = −3.14694e−007  A10 = 1.08762e−008

5th surface

K = −8.43192e−001  A4 = 1.12661e−003  A6 = 4.84084e−005

Various data
Zoom ratio: 3.86

| | Wide-angle | Medium-angle | Telephoto |
|---|---|---|---|
| Focal length | 4.63 | 11.34 | 17.87 |
| F-number | 2.86 | 4.43 | 5.96 |
| Angle of view | 39.93 | 18.87 | 12.23 |
| Image height | 3.88 | 3.88 | 3.88 |
| Total lens length | 29.9 | 27.71 | 32.42 |
| BF | 1.00 | 1.00 | 1.00 |
| d4 | 11.90 | 2.68 | 0.35 |
| d9 | 4.33 | 11.10 | 17.86 |

-continued

Unit: mm

| | | | |
|---|---|---|---|
| d11 | 2.71 | 2.98 | 3.25 |
| Position of entrance pupil | 6.29 | 3.66 | 2.40 |
| Position of exit pupil | −14.73 | −38.08 | −152.54 |
| Front principal point position | 9.51 | 11.67 | 18.18 |
| Rear principal point position | −4.13 | −10.84 | −17.37 |

Data of zoom lens unit

| Unit | Leading surface | Focal length | Lens structure length | Front principal point position | Rear principal point position |
|---|---|---|---|---|---|
| 1 | 1 | −10.27 | 3.90 | 0.35 | −2.21 |
| 2 | 5 | 8.65 | 3.92 | −0.29 | −2.93 |
| 3 | 10 | 24.28 | 1.34 | 0.35 | −0.50 |
| G | 12 | ∞ | 1.30 | 0.51 | −0.51 |

Data of single lens

| Lens | Leading surface | Focal length |
|---|---|---|
| 1 | 1 | −5.96 |
| 2 | 3 | 15.11 |
| 3 | 5 | 6.00 |
| 4 | 6 | −5.18 |
| 5 | 8 | 7.93 |
| 6 | 10 | 24.28 |

Numerical Example 5

Unit: mm

Data of surface

| Surface number | r | d | nd | vd | Effective diameter |
|---|---|---|---|---|---|
| 1 | 58.908 | 1.05 | 1.98055 | 32.3 | 11.42 |
| 2* | 5.296 | 1.49 | | | 8.90 |
| 3 | 8.103 | 1.47 | 2.16250 | 15.2 | 8.99 |
| 4 | 13.535 | (Variable) | | | 8.50 |
| 5* | 4.081 | 1.99 | 1.86400 | 40.6 | 4.02 |
| 6 | −387.078 | 0.50 | 1.84666 | 23.8 | 3.52 |
| 7 | 3.363 | 0.63 | | | 3.20 |
| 8 | 9.034 | 0.94 | 1.77250 | 49.6 | 3.31 |
| 9 | −22.918 | (Variable) | | | 3.45 |
| 10 | 22.853 | 1.50 | 1.64000 | 60.1 | 8.69 |
| 11 | −31.667 | (Variable) | | | 8.70 |
| 12 | ∞ | 0.80 | 1.51633 | 64.1 | 20.00 |
| 13 | ∞ | | | | 20.00 |
| Image plane | ∞ | | | | |

Aspheric surface data

2nd surface

K = −9.10365e−001  A4 = 4.34254e−004  A6 = 8.20182e−008
A8 = 2.62593e−007  A10 = −5.29966e−009

5th surface

K = −8.05088e−001  A4 = 8.32607e−004  A6 = 4.19416e−005
A8 = −4.53459e−006  A10 = 5.54859e−007

Various data
Zoom ratio: 3.86

| | Wide-angle | Medium-angle | Telephoto |
|---|---|---|---|
| Focal length | 4.60 | 11.12 | 17.76 |
| F-number | 2.78 | 4.33 | 5.93 |

-continued

Unit: mm

| | | | |
|---|---|---|---|
| Angle of view | 40.08 | 19.22 | 12.31 |
| Image height | 3.88 | 3.88 | 3.88 |
| Total lens length | 30.21 | 28.27 | 33.00 |
| BF | 0.89 | 0.89 | 0.89 |
| d4 | 11.97 | 2.90 | 0.50 |
| d9 | 4.07 | 11.35 | 18.62 |
| d11 | 2.91 | 2.75 | 2.60 |
| Position of entrance pupil | 6.29 | 3.75 | 2.51 |
| Position of exit pupil | −14.73 | −49.68 | 643.59 |
| Front principal point position | 9.54 | 12.43 | 20.76 |
| Rear principal point position | −3.71 | −10.23 | −16.87 |

Data of zoom lens unit

| Unit | Leading surface | Focal length | Lens structure length | Front principal point position | Rear principal point position |
|---|---|---|---|---|---|
| 1 | 1 | −10.54 | 4.01 | 0.21 | −2.44 |
| 2 | 5 | 8.87 | 4.07 | −0.49 | −3.12 |
| 3 | 10 | 20.97 | 1.50 | 0.39 | −0.54 |
| G | 12 | ∞ | 0.80 | 0.26 | −0.26 |

Data of single lens

| Lens | Leading surface | Focal length |
|---|---|---|
| 1 | 1 | −5.99 |
| 2 | 3 | 15.16 |
| 3 | 5 | 4.69 |
| 4 | 6 | −3.94 |
| 5 | 8 | 8.50 |
| 6 | 10 | 20.97 |

Numerical Example 6

Unit: mm

Data of surface

| Surface number | r | d | nd | vd | Effective diameter |
|---|---|---|---|---|---|
| 1 | 147.550 | 0.80 | 2.09500 | 29.4 | 8.98 |
| 2 | 5.966 | 1.41 | | | 7.59 |
| 3* | 10.520 | 1.40 | 2.10225 | 16.8 | 7.90 |
| 4 | 29.393 | (Variable) | | | 7.62 |
| 5* | 3.467 | 1.60 | 1.69680 | 55.5 | 3.45 |
| 6* | −22.657 | 0.08 | | | 3.07 |
| 7 | 20.810 | 0.80 | 1.84666 | 23.8 | 2.97 |
| 8* | 4.178 | 0.51 | | | 2.58 |
| 9 | −6.301 | 0.80 | 1.48749 | 70.2 | 2.57 |
| 10 | −4.842 | (Variable) | | | 2.62 |
| 11 | ∞ | 1.00 | 1.51633 | 64.1 | 10.00 |
| 12 | ∞ | | | | 10.00 |
| Image plane | ∞ | | | | |

Aspheric surface data

3rd surface

K = 0.00000e+000   A4 = 1.54342e−004   A6 = 4.89477e−007
A8 = 3.77782e−007   A10 = −6.13793e−009

5th surface

K = −1.76777e+000   A4 = 5.42742e−003   A6 = 4.23089e−004
A8 = −7.92812e−005   A10 = 1.52723e−005

6th surface

K = 0.00000e+000   A4 = 2.47308e−003   A6 = 7.79563e−004
A8 = −2.17598e−004   A10 = 2.93527e−005

-continued

Unit: mm

8th surface

K = −1.39105e−002   A4 = 4.29239e−003   A6 = 3.58741e−004
A8 = 4.10427e−005   A10 = 6.09760e−005

Various data
Zoom ratio: 2.84

| | Wide-angle | Medium-angle | Telephoto |
|---|---|---|---|
| Focal length | 5.15 | 9.88 | 14.61 |
| F-number | 3.46 | 4.61 | 5.76 |
| Angle of view | 36.99 | 21.44 | 14.87 |
| Image height | 3.88 | 3.88 | 3.88 |
| Total lens length | 26.49 | 22.20 | 22.87 |
| BF | 1.00 | 1.00 | 1.00 |
| d4 | 10.64 | 3.00 | 0.30 |
| d10 | 6.44 | 9.81 | 13.17 |
| Position of entrance pupil | 5.62 | 3.45 | 2.12 |
| Position of exit pupil | −9.64 | −13.01 | −16.37 |
| Front principal point position | 8.28 | 6.36 | 4.44 |
| Rear principal point position | −4.15 | −8.88 | −13.61 |

Data of zoom lens unit

| Unit | Leading surface | Focal length | Lens structure length | Front principal point position | Rear principal point position |
|---|---|---|---|---|---|
| 1 | 1 | −10.75 | 3.61 | −0.38 | −2.96 |
| 2 | 5 | 7.65 | 3.79 | −0.73 | −3.21 |
| G | 11 | ∞ | 1.00 | 0.33 | −0.33 |

Data of single lens

| Lens | Leading surface | Focal length |
|---|---|---|
| 1 | 1 | −5.69 |
| 2 | 3 | 14.31 |
| 3 | 5 | 4.43 |
| 4 | 7 | −6.31 |
| 5 | 9 | 36.35 |

TABLE 1

| | Lower | Upper | Numerical Example | | |
|---|---|---|---|---|---|
| Condition | Limit | Limit | 1 | 2 | 3 |
| (1) | 5.0 | 16.9 | 16.80 | 15.50 | 14.60 |
| (2) | 0.1 | 5.0 | 2.30 | 1.90 | 0.84 |
| (3) | 1.9 | 2.4 | 2.25 | 2.26 | 2.18 |
| (4) | −0.100 | −0.046 | −0.0528 | −0.0647 | −0.0646 |
| (5) | 3.0 | 6.0 | 3.89 | 3.43 | 3.54 |
| (6) | 1.2 | 2.0 | 1.77 | 1.42 | 1.68 |
| (7) | 1.2 | 2.3 | 2.07 | 2.05 | 1.98 |
| (8) | 0.9 | 1.6 | 1.09 | 1.11 | 1.10 |
| (9) | 1.0 | 4.6 | 4.25 | 4.29 | 4.22 |
| (10) | 1.9 | 2.5 | 1.91 | 2.08 | 1.99 |
| (11) | 20.0 | 40.0 | 35.25 | 30.40 | 29.06 |
| (12) | 4.1 | 6.5 | 4.75 | 4.42 | 6.26 |

| | Lower | Upper | Numerical Example | | |
|---|---|---|---|---|---|
| Condition | Limit | Limit | 4 | 5 | 6 |
| (1) | 5.0 | 16.9 | 16.80 | 15.17 | 16.80 |
| (2) | 0.1 | 5.0 | 1.96 | 2.82 | 2.05 |
| (3) | 1.9 | 2.4 | 2.22 | 2.29 | 2.09 |
| (4) | −0.100 | −0.046 | −0.0637 | −0.0700 | −0.0861 |
| (5) | 3.0 | 6.0 | 5.18 | 4.77 | 3.62 |
| (6) | 1.2 | 2.0 | 1.47 | 1.44 | 1.33 |
| (7) | 1.2 | 2.3 | 1.87 | 1.93 | 1.49 |

TABLE 1-continued

| | | | | | |
|---|---|---|---|---|---|
| (8) | 0.9 | 1.6 | 1.19 | 1.19 | 1.41 |
| (9) | 1.0 | 4.6 | 3.04 | 3.10 | 1.30 |
| (10) | 1.9 | 2.5 | 1.91 | 1.98 | 2.10 |
| (11) | 20.0 | 40.0 | 35.25 | 32.30 | 29.42 |
| (12) | 4.1 | 6.5 | 5.24 | 4.56 | — |

Next, a digital camera according to an exemplary embodiment using the zoom lens illustrated in each of the aforementioned exemplary embodiments as a photographic optical system will be described with reference to FIG. 13. In FIG. 13, reference numeral 20 denotes a camera body, and reference numeral 21 denotes a photographic optical system configured by using the zoom lens according to the exemplary embodiment of the present invention. Reference numeral 22 denotes an image sensor, such as a CCD sensor, which receives an object image formed by the photographic optical system 21. Reference numeral 23 denotes a recording unit which records the object image received by the image sensor 22, and reference numeral 24 denotes a viewfinder for monitoring the object image displayed on a display device (not illustrated). The display device is configured by using a liquid crystal panel or the like to display the object image formed on the image sensor 22.

In this manner, the zoom lens according to the exemplary embodiment of the present invention applies to an optical apparatus such as a digital camera, so that an image pickup apparatus having a high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-048670 filed Mar. 7, 2011, which is hereby incorporated by reference herein in its entirety.

What is claimed is:

1. A zoom lens comprising, in order from an object side to an image side:
   a first lens unit having a negative refractive power; and
   a second lens unit having a positive refractive power, a distance between the first lens unit and the second lens unit varying during zooming,
   wherein the first lens unit includes, in order from the object side to the image side, a negative lens and a positive lens of which an object-side lens surface is convex, and
   wherein, when an Abbe number of a material of the positive lens of the first lens unit is denoted by vd1p, a focal length of the first lens unit is denoted by f1, a distance between an image-side lens surface of the first lens unit and an object-side lens surface of the second lens unit at a telephoto end is denoted by d12t, and focal lengths of the entire zoom lens at a wide-angle end and the telephoto end are denoted by fw and ft, respectively, the following conditions are satisfied:

$5.0 < vd1p < 16.9$ $0.1 < (d12t/ft)*100 < 5.0$ $1.9 < |f1|/fw < 2.4$.

2. The zoom lens according to claim 1, wherein, when an Abbe number of a material of the negative lens of the first lens unit is denoted by vd1n, and a radius of curvature of an object-side lens surface and a radius of curvature of an image-side lens surface of the negative lens of the first lens unit are denoted by R1na and R1nb, respectively, the following condition is satisfied:

$-0.100 < [(R1nb+R1na)/(R1nb-R1na)]/(vd1n-vd1p) < -0.046$.

3. The zoom lens according to claim 1, wherein, when a radius of curvature of an image-side lens surface of the negative lens of the first lens unit is denoted by R1nb, and a radius of curvature of an object-side lens surface of the positive lens of the first lens unit is denoted by R1pa, the following condition is satisfied:

$3.0 < (R1pa+R1nb)/(R1pa-R1nb) < 6.0$.

4. The zoom lens according to claim 1, wherein, when a focal length of the positive lens of the first lens unit is denoted by f1p, the following condition is satisfied:

$1.2 < f1p/f1 < 2.0$.

5. The zoom lens according to claim 1, wherein, when a focal length of the second lens unit is denoted by f2, the following condition is satisfied:

$1.2 < f2/fw < 2.3$.

6. The zoom lens according to claim 1, wherein, when a focal length of the second lens unit is denoted by f2, the following condition is satisfied:

$0.9 < |f1|/f2 < 1.6$.

7. The zoom lens according to claim 1, wherein, when an amount of movement of the second lens unit during zooming from the wide-angle end to the telephoto end is denoted by M2, the following condition is satisfied:

$1.0 < M2/fw < 4.6$.

8. The zoom lens according to claim 1, wherein, when a d-line refractive index of a material of the negative lens of the first lens unit is denoted by nd1n, and an Abbe number of the material of the negative lens of the first lens unit is denoted by vd1n, the following conditions are satisfied:

$1.86 < nd1n < 2.5$ $20.0 < vd1n < 40.0$.

9. The zoom lens according to claim 1, further comprising a third lens unit having a positive refractive power located on the image side of the second lens unit.

10. The zoom lens according to claim 9, wherein, when a focal length of the third lens unit is denoted by f3, the following condition is satisfied:

$4.1 < f3/fw < 6.5$.

11. The zoom lens according to claim 9, wherein the third lens unit includes one positive lens.

12. The zoom lens according to claim 9, wherein the third lens unit is movable during zooming.

13. The zoom lens according to claim 1, further comprising an aperture stop located on the image side of the second lens unit and configured to move integrally with the second lens unit during zooming.

14. The zoom lens according to claim 1, wherein the zoom lens is configured to form an image on a photoelectric conversion element.

15. An image pickup apparatus comprising:
    a zoom lens; and
    a photoelectric conversion element configured to receive an image formed by the zoom lens,
    wherein zoom lens comprises, in order from an object side to an image side;

a first lens unit having a negative refractive power; and
a second lens unit having a positive refractive power, a distance between the first lens unit and the second lens unit varying during zooming,
wherein the first lens unit includes, in order from the object side to the image side, a negative lens and a positive lens of which an object-side lens surface is convex, and
wherein, when an Abbe number of a material of the positive lens of the first lens unit is denoted by vd1p, a focal length of the first lens unit is denoted by f1, a distance between an image-side lens surface of the first lens unit and an object-side lens surface of the second lens unit at a telephoto end is denoted by d12t, and focal lengths of the entire zoom lens at a wide-angle end and the telephoto end are denoted by fw and ft, respectively, the following conditions are satisfied:

$5.0 < vd1p < 16.9$ $0.1 < (d12t/ft)*100 < 5.0$ $1.9 < |f1|/fw < 2.4.$

* * * * *